(12) United States Patent
Nakahara

(10) Patent No.: US 12,352,936 B2
(45) Date of Patent: Jul. 8, 2025

(54) OPTICAL SYSTEM, LENS APPARATUS, AND IMAGE PICKUP APPARATUS

(71) Applicant: CANON KABUSHIKI KAISHA, Tokyo (JP)

(72) Inventor: Makoto Nakahara, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 687 days.

(21) Appl. No.: 17/692,845

(22) Filed: Mar. 11, 2022

(65) Prior Publication Data
US 2022/0299741 A1   Sep. 22, 2022

(30) Foreign Application Priority Data

Mar. 17, 2021 (JP) .................................. 2021-043282

(51) Int. Cl.
*G02B 15/14* (2006.01)
(52) U.S. Cl.
CPC .................................. *G02B 15/14* (2013.01)
(58) Field of Classification Search
CPC ...... G02B 15/14; G02B 15/10; G02B 27/646; G02B 15/12; G02B 15/02; G02B 15/00
See application file for complete search history.

(56) References Cited

U.S. PATENT DOCUMENTS 8,873,154 B2 * 10/2014 Takemoto ............... G02B 15/12 359/672
2013/0308041 A1 * 11/2013 Hatada ............ G02B 15/144111 359/557

2018/0373001 A1 * 12/2018 Tanaka ................... G02B 13/18
2020/0018936 A1 * 1/2020 Ori ........................ G02B 15/10
2020/0271903 A1 * 8/2020 Ebe .......................... G02B 9/10

FOREIGN PATENT DOCUMENTS

| JP | 57-084417 A | 5/1982 |
| JP | 2006-084925 A | 3/2006 |
| JP | 2013238827 A | 11/2013 |
| JP | 2015-141257 A | 8/2015 |
| JP | 2017-125927 A | 7/2017 |
| JP | 2020-012889 A | 1/2020 |
| JP | 2021012244 A * | 2/2021 |

OTHER PUBLICATIONS

Machine translation of JP-2021012244-A (Year: 2021).*

* cited by examiner

*Primary Examiner* — Darryl J Collins
*Assistant Examiner* — Matthew Y Lee
(74) *Attorney, Agent, or Firm* — Canon U.S.A., Inc. IP Division

(57) ABSTRACT

An optical system includes a main optical system including an aperture stop, and a variable-magnification optical system configured to be removably inserted between the aperture stop and an image plane. A distance from a lens surface that is the closest to an object side in the main optical system to the image plane is constant before and after insertion and removal of the variable-magnification optical system. The main optical system includes a plurality of positive lenses and a plurality of negative lenses. A distance from the lens surface that is the closest to the object side in the main optical system to a lens surface of a negative lens that is the closest to the object side among the plurality of negative lenses and a total length of the main optical system satisfy a predetermined relationship.

30 Claims, 14 Drawing Sheets

OPTICAL SYSTEM, LENS APPARATUS, AND IMAGE PICKUP APPARATUS

BACKGROUND

Field of the Disclosure

The aspect of the embodiments relates to an optical system suitable for an image pickup apparatus such as a digital video camera, a digital still camera, a broadcasting camera, and a silver-halide film camera.

Description of the Related Art

As a method of changing a focal length of an optical system used for an image pickup apparatus, known is a converter method of inserting a variable-magnification optical system (extender) into an optical path and thereby changing a focal length of the entire system.

Japanese Patent Application Laid-Open No. 2013-238827 discusses an optical system including a variable-magnification optical system that can be inserted into and removed from a predetermined position on an image side of an aperture stop in a main optical system.

In a case of adopting a method of incorporating the variable-magnification optical system, not only appropriate selection of an insertion position of the variable-magnification optical system, but also appropriate configuration of the main optical system is important to obtain favorable optical characteristics while achieving a reduction in weight of the entire system including the variable-magnification optical system. There is a room for improvement in the technique discussed in Japanese Patent Application Laid-Open No. 2013-238827 in terms of achieving both a reduction in weight and optical characteristics.

SUMMARY OF THE DISCLOSURE

According to an aspect of the embodiments, an optical system includes a main optical system including an aperture stop, and a variable-magnification optical system configured to be removably inserted between the aperture stop and an image plane, wherein a distance from a lens surface that is the closest to an object side in the main optical system to the image plane is constant before and after insertion and removal of the variable-magnification optical system, wherein the main optical system includes a plurality of positive lenses and a plurality of negative lenses, and wherein the following inequality is satisfied:

$$0.20 < D1N/LD < 0.50,$$

where D1N is a distance from the lens surface that is the closest to the object side in the main optical system to a lens surface of a negative lens G1N that is the closest to the object side among the plurality of negative lenses, and LD is a distance from the lens surface that is the closest to the object side in the main optical system to the image plane.

Further features of the disclosure will become apparent from the following description of exemplary embodiments with reference to the attached drawings.

DESCRIPTION OF THE EMBODIMENTS

Embodiments regarding an optical system according to the disclosure, and a lens apparatus and an image pickup apparatus each having the optical system are described below with reference to the attached drawings.

Figure 1:
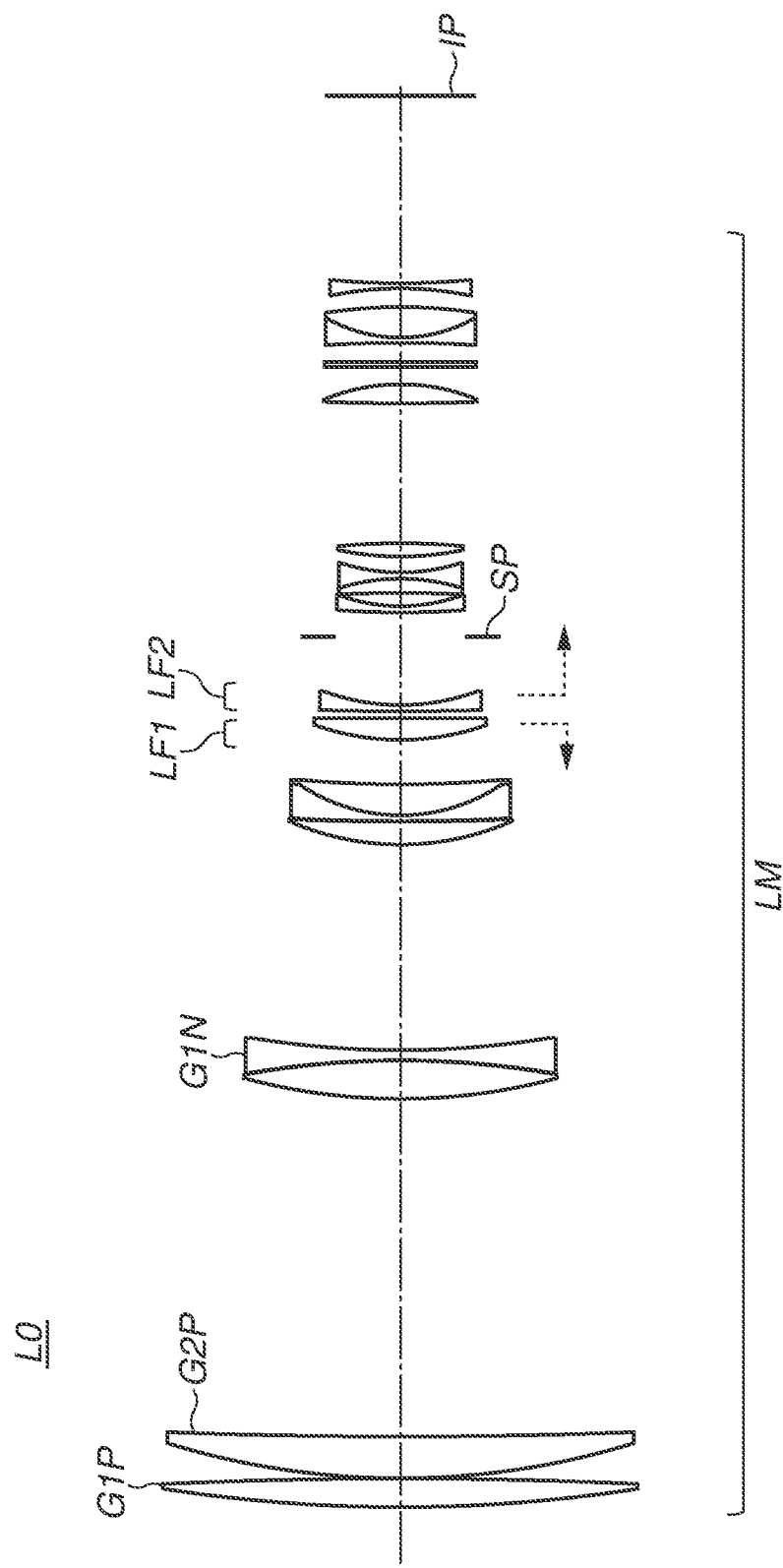
FIG. 1 is a sectional view illustrating a main optical system according to a first embodiment.
Figure 3:
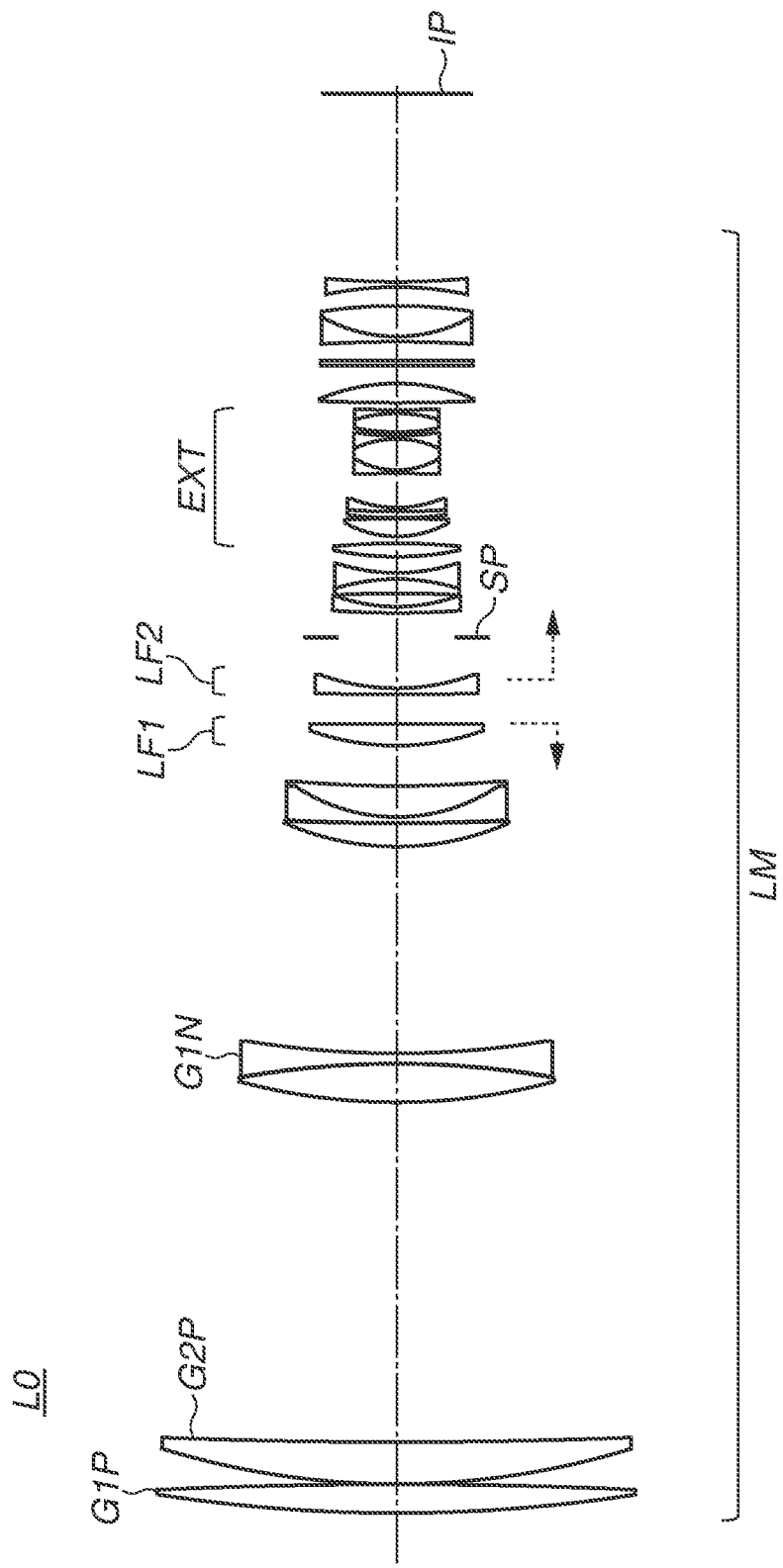
FIG. 3 is a sectional view illustrating an optical system according to the first embodiment in a state where a variable-magnification optical system is inserted.
Figure 5:
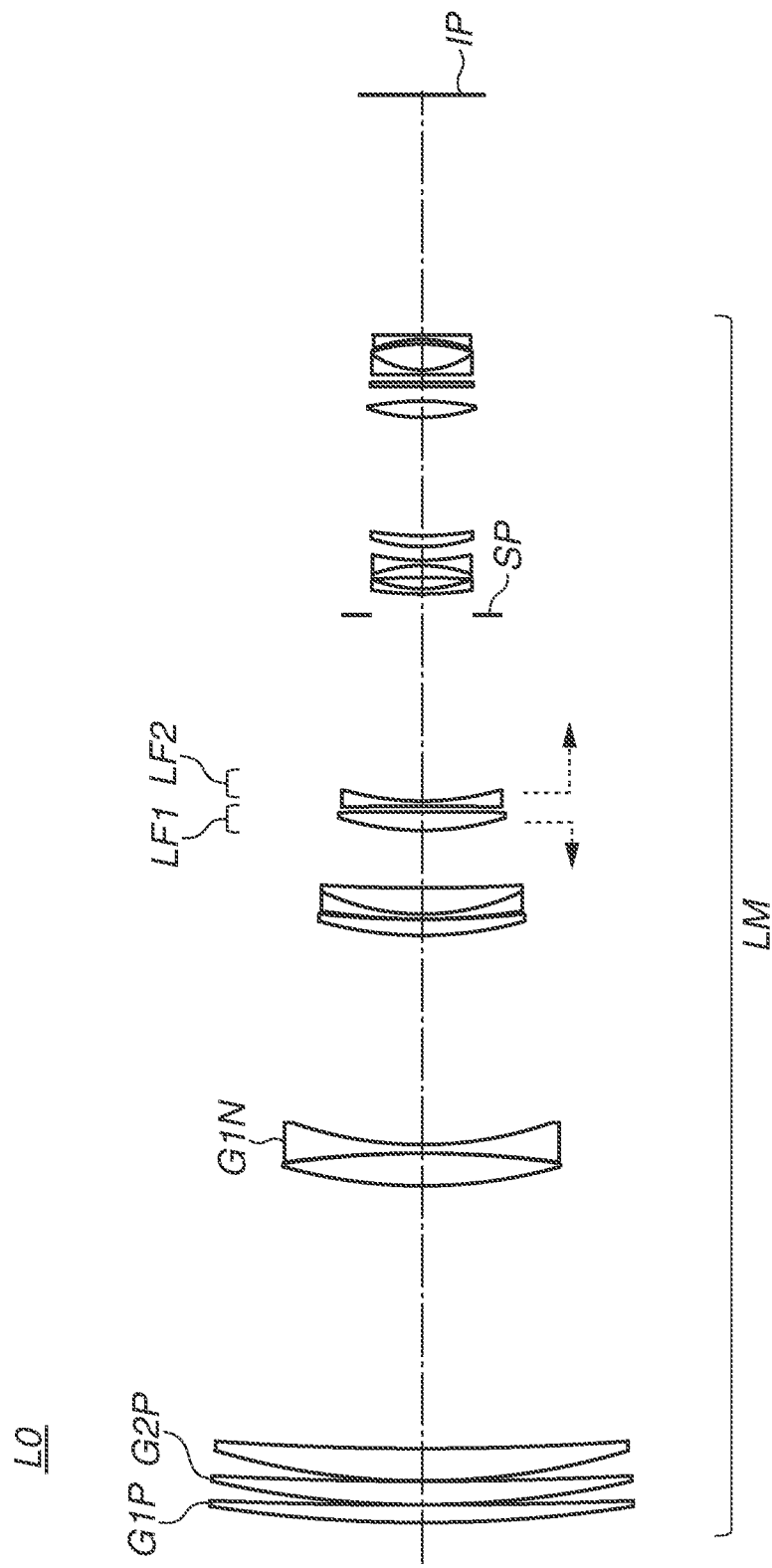
FIG. 5 is a sectional view illustrating a main optical system according to a second embodiment.
Figure 7:
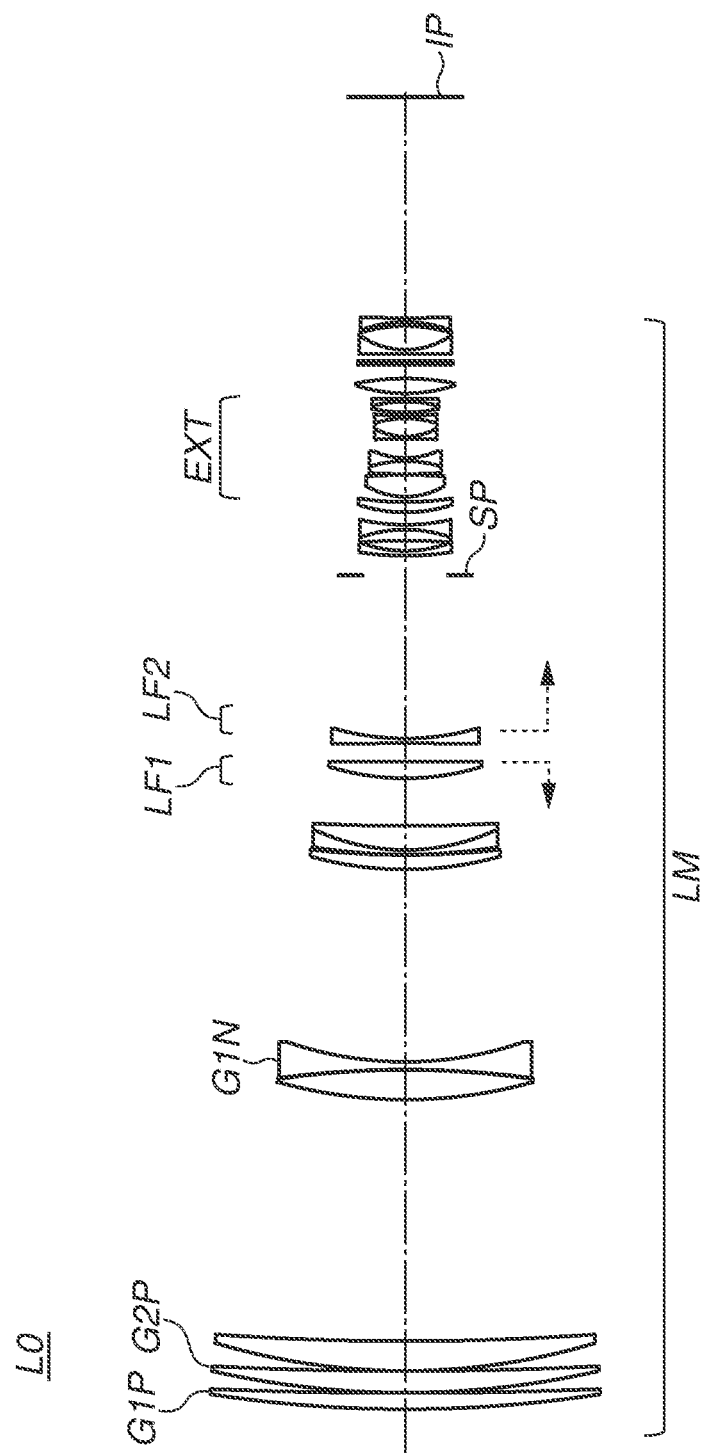
FIG. 7 is a sectional view illustrating an optical system according to the second embodiment in a state where the variable-magnification optical system is inserted.
Figure 9:
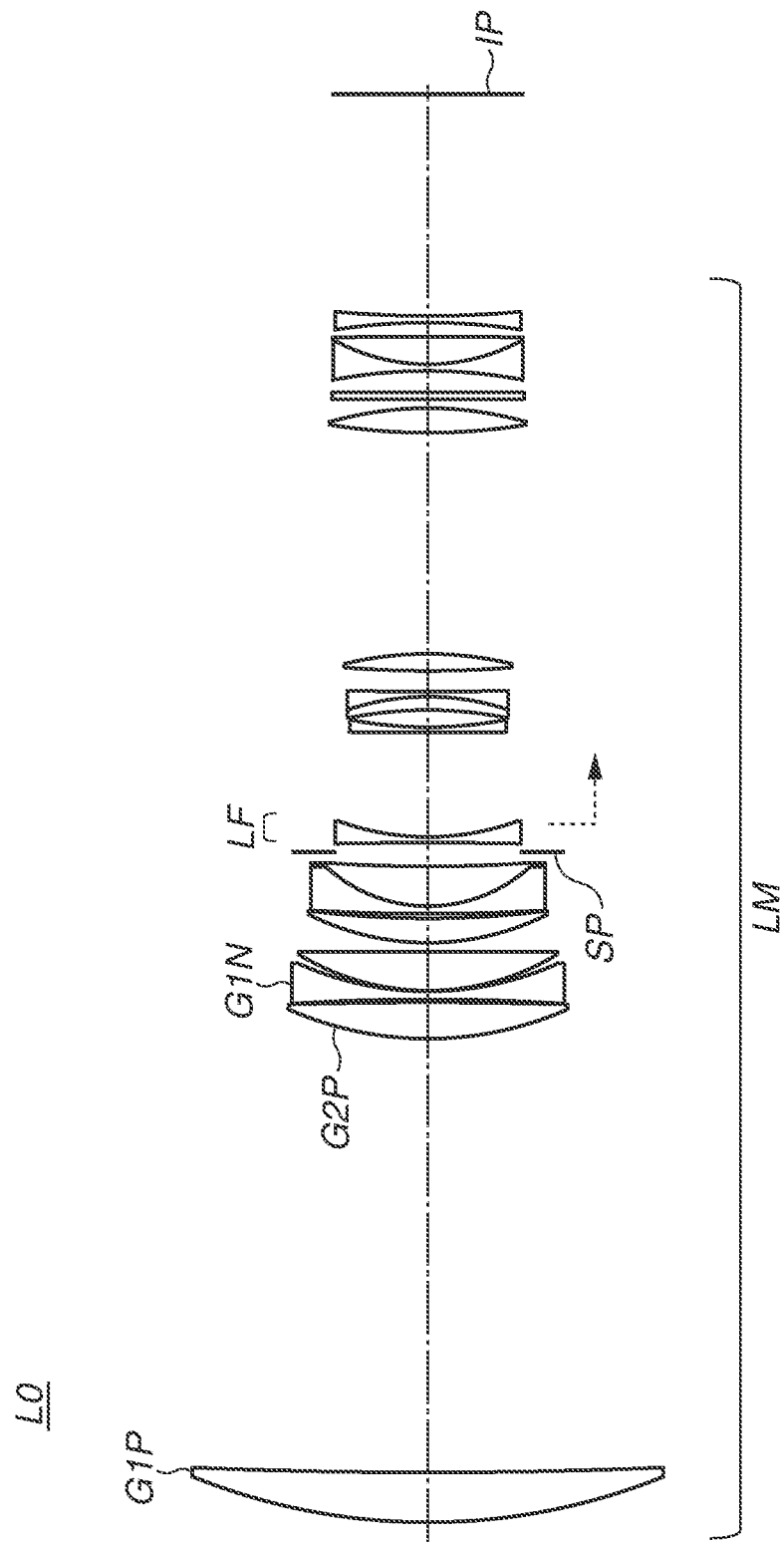
FIG. 9 is a sectional view illustrating a main optical system according to a third embodiment.
Figure 11:
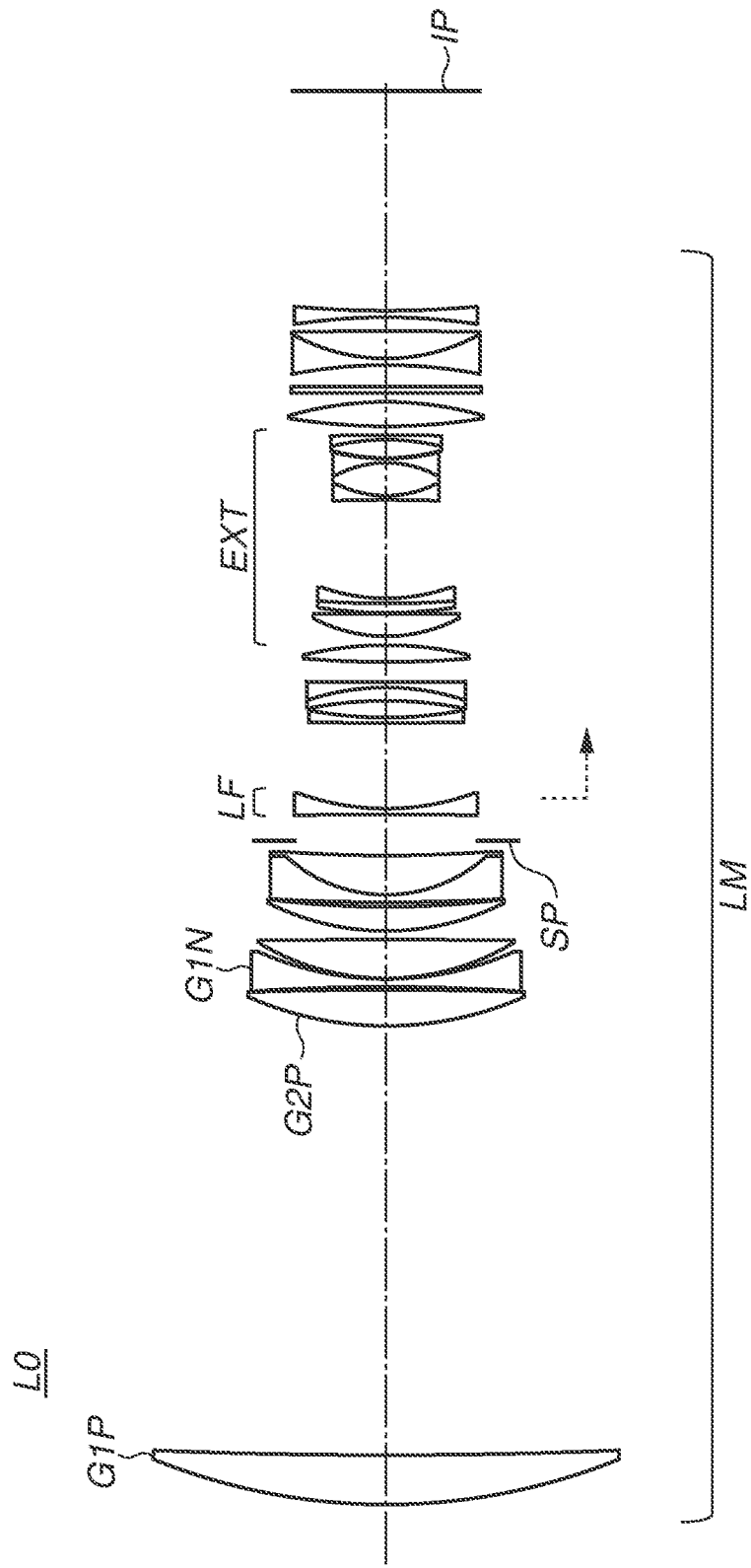
FIG. 11 is a sectional view illustrating an optical system according to a third embodiment in a state where the variable-magnification optical system is inserted.

FIGS. 1 and 3 are sectional views each illustrating an optical system L0 according to a first embodiment when focusing on an object at infinity. FIGS. 5 and 7 are sectional views each illustrating an optical system L0 according to a second embodiment when focusing on an object at infinity. FIGS. 9 and 11 are sectional views each illustrating an optical system L0 according to a third embodiment when focusing on an object at infinity. The optical systems L0 according to the respective embodiments each include a main optical system LM and a variable-magnification optical system EXT. FIGS. 1, 5, and 9 are sectional views each illustrating the main optical system LM in the optical system L0 according to the corresponding embodiment. FIGS. 3, 7, and 11 are sectional views each illustrating a state where the variable-magnification optical system EXT is inserted into an optical path of the main optical system LM in the optical system L0 according to the corresponding embodiment. The optical system L0 according to each of the embodiments can be used for an image pickup apparatus, such as a digital video camera, a digital still camera, a broadcasting camera, a silver-halide film camera, and a monitoring camera.

In each sectional view, the left side is an object side, and the right side is an image side. Each sectional view illustrates an aperture stop SP and an image plane IP. In a case where the optical system L0 according to each of the embodiments is used as an image pickup optical system for the digital video camera or the digital still camera, an image pickup plane of a solid-state image pickup element (photoelectric conversion element) such as a charge-coupled device (CCD) sensor and a complementary metal-oxide semiconductor (CMOS) sensor is arranged on the image plane IP. In a case where the optical system L0 according to each of the embodiments is used as an image pickup optical system for the silver-halide film camera, a photosurface of a film is arranged on the image plane IP.

The main optical system LM is an optical system that can also be used for imaging independently, and includes a plurality of positive lenses and a plurality of negative lenses. The variable-magnification optical system EXT is configured so that it can be inserted into and removed from the optical path of the main optical system LM. In each of the embodiments, the variable-magnification optical system EXT has negative refractive power, and a conversion magnification (an increase rate of a focal length) M is 1.4. That is, insertion of the variable-magnification optical system EXT into the optical path of the main optical system LM extends a focal length of the entire system of the optical system L0. In each of the embodiments, the variable-magnification optical system EXT is removably inserted between the aperture stop SP and the image plane IP. Additionally, in each of the embodiments, a total lens length (a distance from a lens surface arranged the closest to an object to the image plane IP) is constant before and after insertion and removal of the variable-magnification optical system EXT.

In the optical system L0 according to each of the embodiments, at least one lens unit moves at the time of focusing. Focus lens units LF1, LF2, and LF move at the time of focusing. Moving directions of the respective focus lens units at the time of focusing from a point at infinity to a close range are indicated by respective arrows in each of the sectional views. In the optical system L0 according to each of the embodiments, there may be only one lens unit or two or more lens units that move at the time of focusing.

Figure 2:
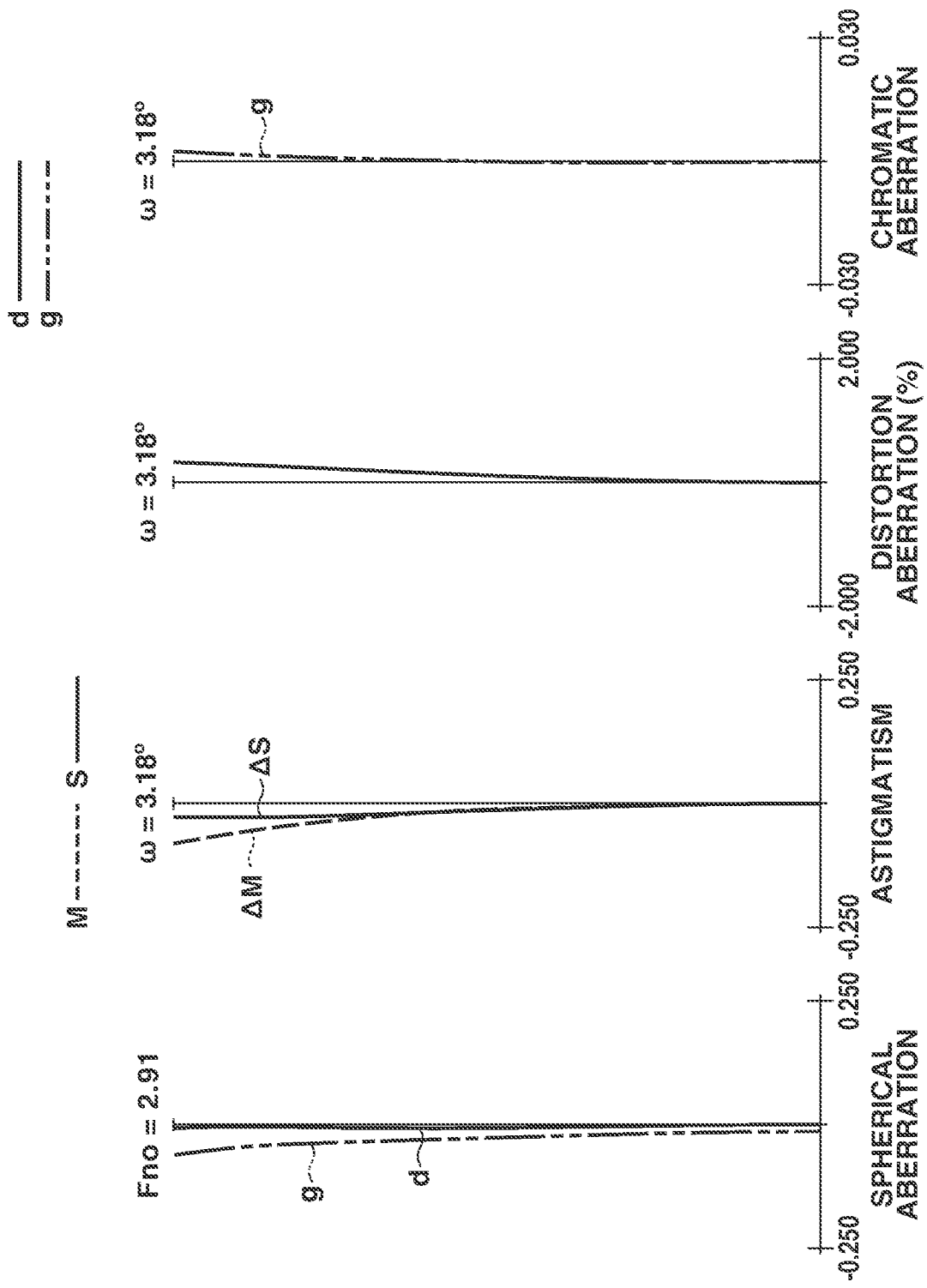
FIG. 2 is an aberration diagram of the main optical system according to the first embodiment.
Figure 4:
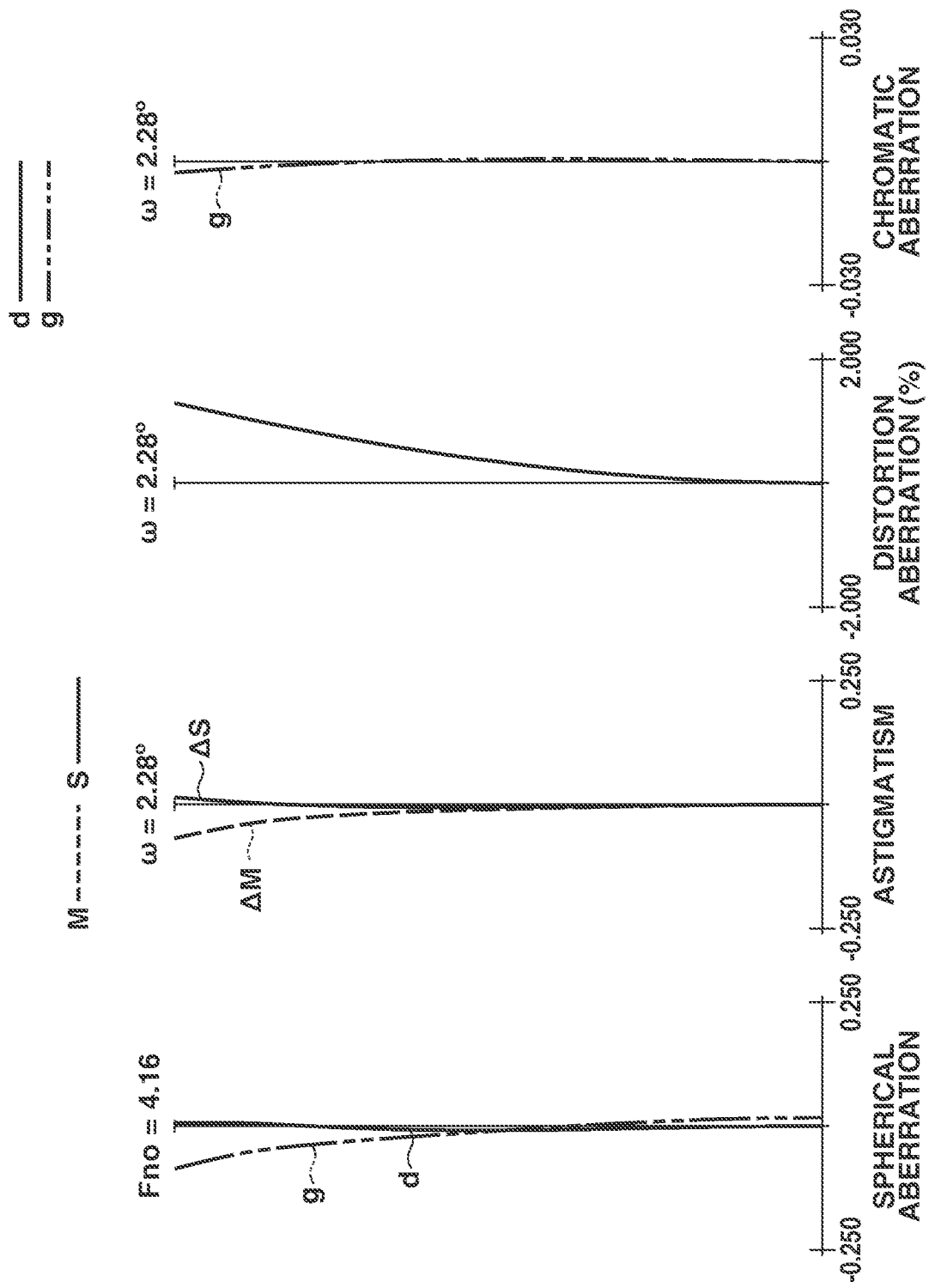
FIG. 4 is an aberration diagram of the optical system according to the first embodiment in the state where the variable-magnification optical system is inserted.
Figure 6:
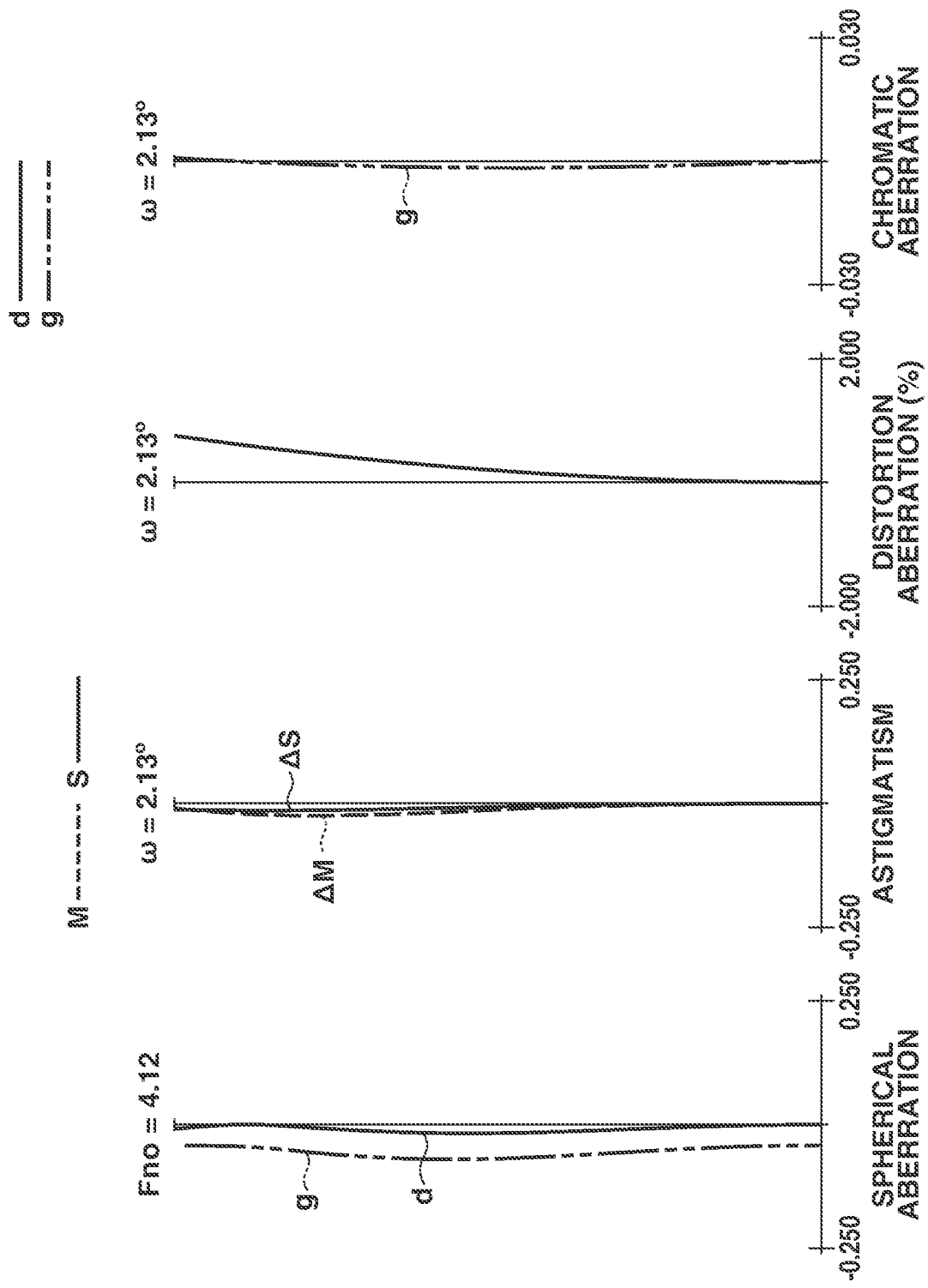
FIG. 6 is an aberration diagram of the main optical system according to the second embodiment.
Figure 8:
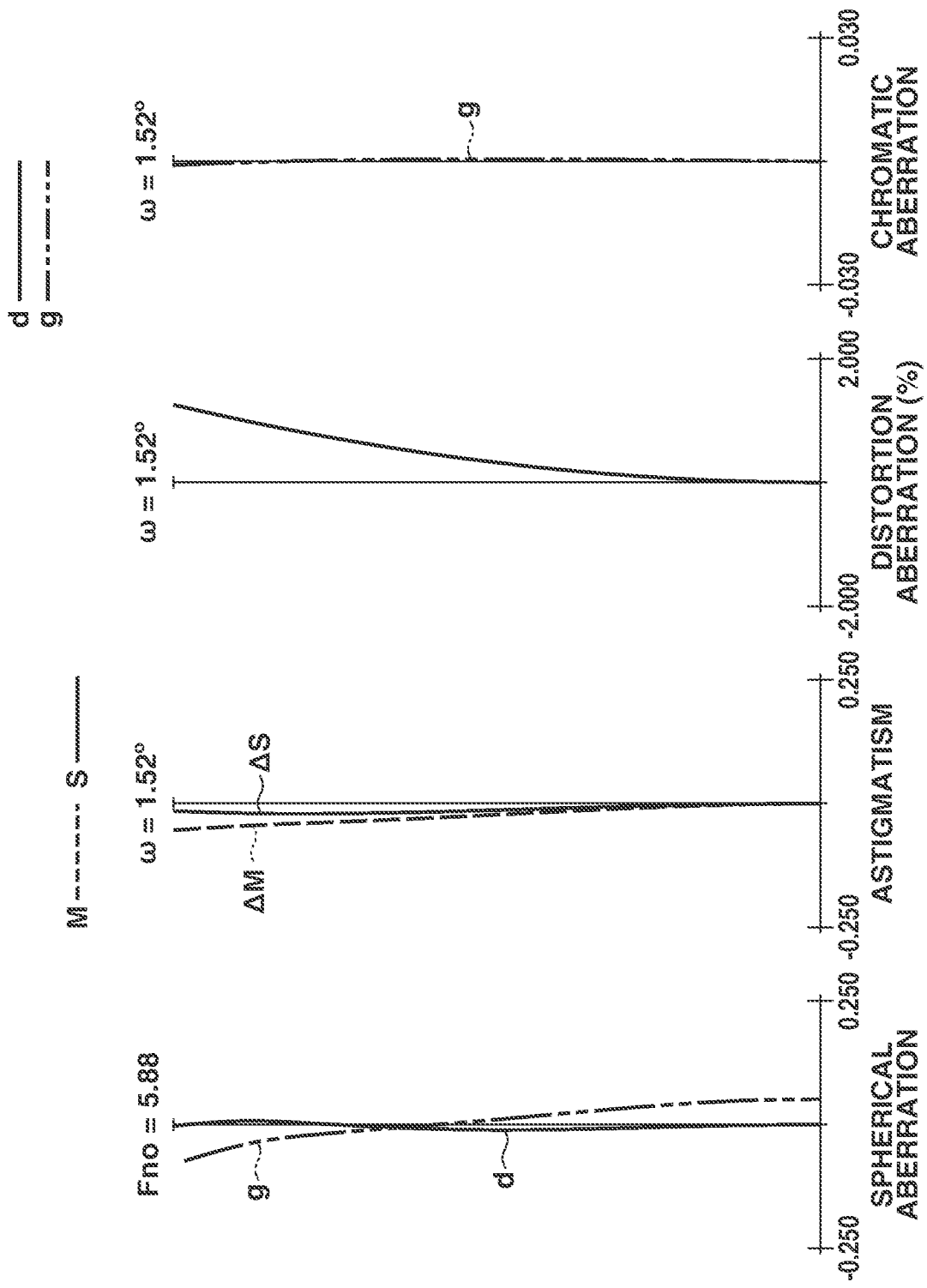
FIG. 8 is an aberration diagram of the optical system according to the second embodiment in the state where the variable-magnification optical system is inserted.
Figure 10:
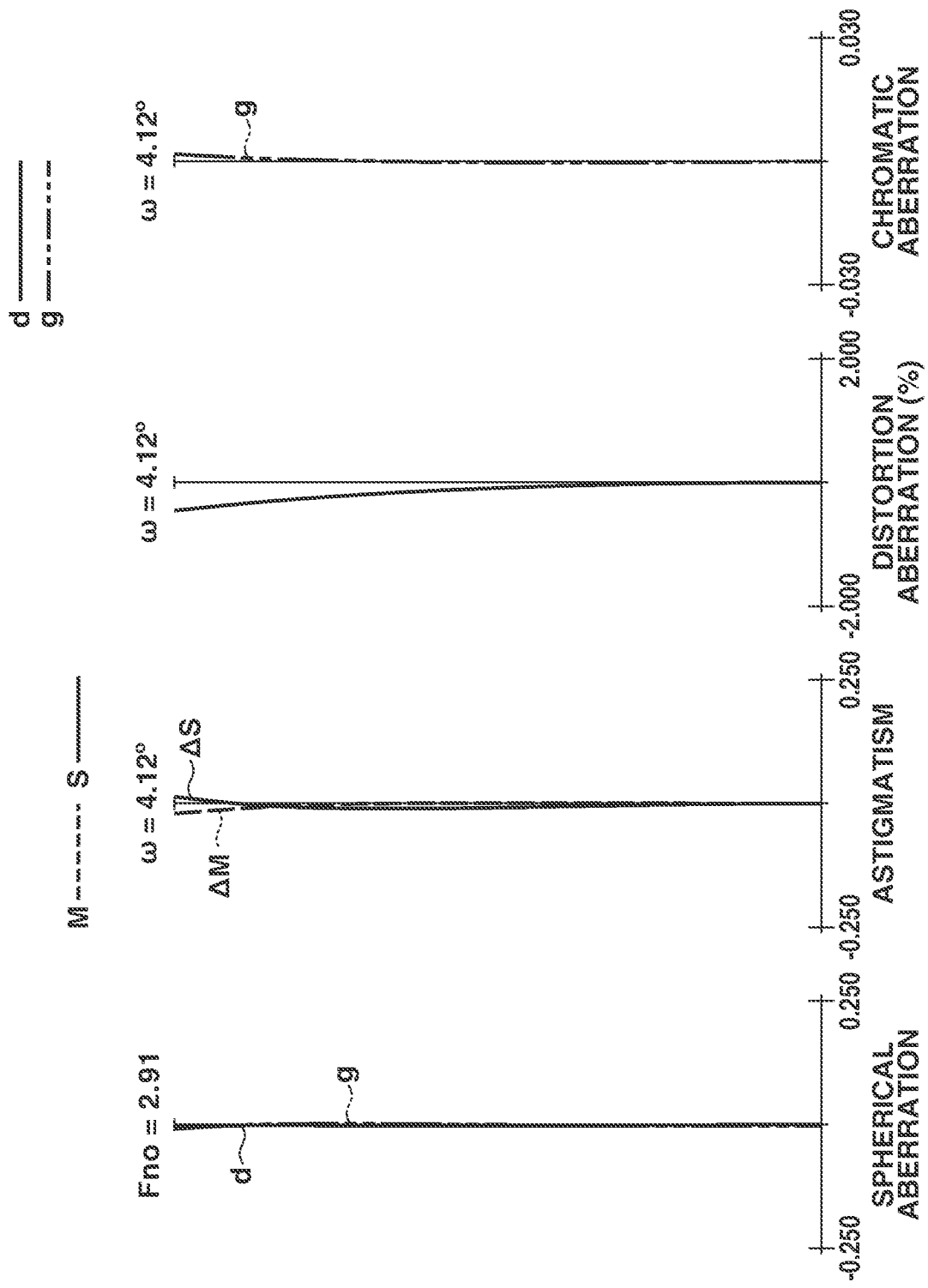
FIG. 10 is an aberration diagram of the main optical system according to the third embodiment.
Figure 12:
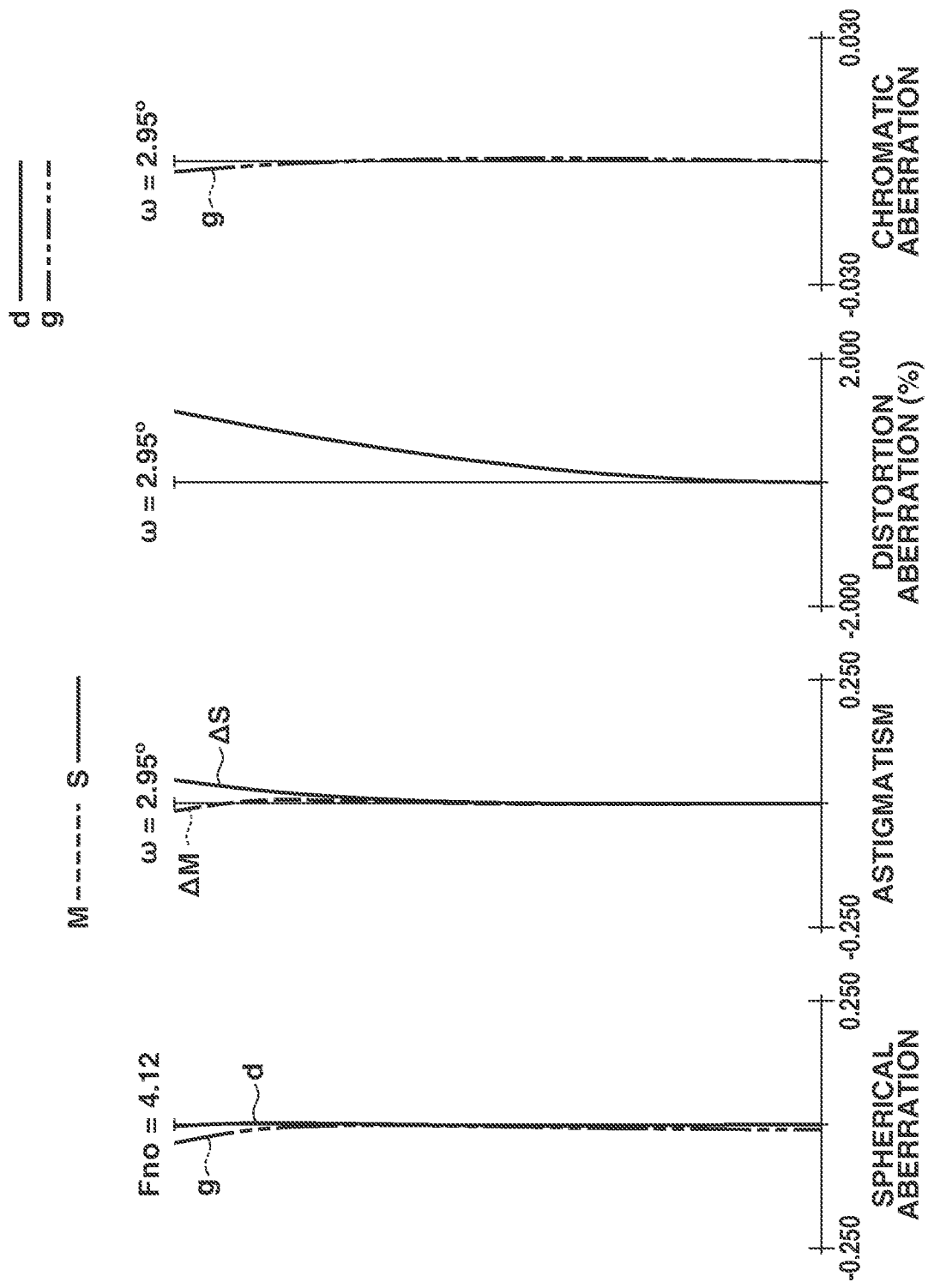
FIG. 12 is an aberration diagram of the optical system according to the third embodiment in the state where the variable-magnification optical system is inserted.

FIGS. 2 and 4 are longitudinal-aberration diagrams in the state where the optical system L0 according to the first embodiment focuses on the object at infinity. FIGS. 6 and 8 are longitudinal-aberration diagrams in the state where the optical system L0 according to the second embodiment focuses on the object at infinity. FIGS. 10 and 12 are longitudinal-aberration diagrams in the state where the optical system L0 according to the third embodiment focuses on the object at infinity. Among these drawings, each of FIGS. 2, 6, and 10 is an aberration diagram of the main optical system LM in the optical system L0 according to the corresponding embodiment. Each of FIGS. 4, 8, and 12 is an aberration diagram in the state where the variable-magnification optical system EXT is inserted into the optical path of the main optical system LM in the optical system L0 according to the corresponding embodiment.

FNo represents an F-number in a spherical aberration diagram. In the spherical aberration diagram, amounts of spherical aberration at the d-line (a wavelength of 587.6 nm) and the g-line (a wavelength of 435.8 nm) are indicated by a solid line and an alternate long and two short dashes line, respectively. In an astigmatism diagram, $\Delta S$ represents an amount of astigmatism (indicated by a solid line) on a Sagittal image plane, and $\Delta M$ represents an amount of astigmatism (indicated by a broken line) on a Meridional image plane. A distortion aberration diagram illustrates an amount of distortion aberration at the d-line. A chromatic aberration diagram illustrates an amount of chromatic aberration at the g-line. In addition, to is a half angle of field(°).

Next, characteristic configurations and conditions of the optical systems L0 according to the respective embodiments will be described.

In a case where the main optical system LM is a telephoto lens unit, a lens has a larger effective diameter and a larger lens external diameter as the lens becomes closer to the object. For this reason, in a case where the variable-magnification optical system EXT is inserted at a position relatively closer to the object side in the main optical system LM, it becomes difficult to downsize the variable-magnification optical system EXT. Furthermore, there is a case where spherical aberration or coma aberration in the optical system L0 varies greatly before and after insertion of the variable-magnification optical system EXT.

For this reason, in the optical system L0 according to each of the embodiments, the variable-magnification optical system EXT is arranged between the aperture stop SP and the image plane IP. This enables a reduction in diameter of a luminous flux incident on the variable-magnification optical system EXT, and consequently, achieves downsizing of the variable-magnification optical system EXT. Furthermore, the configuration reduces a variation in spherical aberration and comatic aberration before and after insertion of the variable-magnification optical system EXT.

In a case of adopting a configuration in which the variable-magnification optical system can be inserted into and removed from the optical path of the main optical system, a mechanism for inserting/removing the variable-magnification optical system is provided, so that the entire lens apparatus tends to increase in weight. Hence, a reduction in weight of the entire optical system including the main optical system is important.

The reduction in weight of the optical system requires a reduction in weight of each lens constituting the optical system. The reduction in weight of each lens requires a reduction in effective diameter of each lens. Comparing a positive lens and a negative lens each having equal refractive power, the negative lens is more likely to increase in weight.

For this reason, in the optical system L0 according to each of the embodiments, a negative lens G1N arranged the closest to the object side among the negative lenses included in the main optical system LM is arranged appropriately downward to the image side. This allows light rays sufficiently converged by one or more positive lenses arranged on the object side of the negative lens G1N to be incident on the negative lens G1N, and can thereby effectively reduce a diameter of the negative lens G1N. As a result, the optical system L0 can be configured to have a reduced weight.

Specifically, the optical system L0 according to each of the embodiments is configured to satisfy the following inequality.

$$0.20 < D1N/LD < 0.50 \qquad (1)$$

In this inequality, D1N is a distance between the lens surface arranged the closest to the object side in the optical system L0 to the lens surface of the negative lens G1N on the object side. LD is a distance from the lens surface arranged the closest to the object side in the optical system L0 to the image plane IP (total lens length).

The inequality (1) defines a condition for achieving favorable optical characteristics while reducing the weight of the optical system L0.

In a case where a value of D1N/LD falls below a lower limit value of the inequality (1), the negative lens G1N is too close to the object, resulting in a too large effective diameter of the negative lens G1N. This leads to an increase in mass of the negative lens G1N. In a case where the value of D1N/LD exceeds an upper limit value of the inequality (1), the negative lens G1N becomes too close to the image side, and an incident height of an on-axis light ray incident on the negative lens G1N becomes too small. As a result, it becomes difficult for the negative lens G1N to correct the spherical aberration of the optical system L0.

The above-mentioned configuration enables obtaining of favorable optical characteristics while achieving a reduction in weight of the entire system in the optical system L0 including the variable-magnification optical system EXT that is inserted into and removed from the main optical system LM.

In one embodiment, at least one of the upper limit value and the lower limit value of a numeric value range in the inequality (1) is set as defined by the following inequality (1a), or as defined by the inequality (1b).

$$0.23 < D1N/LD < 0.47 \quad (1a)$$

$$0.25 < D1N/LD < 0.45 \quad (1b)$$

Next, conditions that are satisfied by the optical system L0 according to each of the embodiments will be described. At least one or more of the following inequalities are satisfied by the optical system L0 according to each of the embodiments.

$$0.40 < LD/f < 1.20 \quad (2)$$

$$0.40 < Le/Lp < 0.97 \quad (3)$$

$$-0.80 < fe/f < -0.20 \quad (4)$$

$$1.0 < fa/f < 9.0 \quad (5)$$

$$0.20 < fb/f < 0.90 \quad (6)$$

$$-18 < fa/fe < -2.0 \quad (7)$$

$$-3.5 < fb/fe < -0.30 \quad (8)$$

$$1.58 < ndG1N < 1.89 \quad (9)$$

$$22 < vdG1N < 55 \quad (10)$$

$$-1.3 < SFG1N < 0.50 \quad (11)$$

$$1.41 < ndG1P < 1.69 \quad (12)$$

$$55 < vdG1P < 95 \quad (13)$$

$$1.40 < ndG2P < 1.67 \quad (14)$$

$$55 < vdG2P < 99 \quad (15)$$

$$-0.95 < fG1N/f < -0.08 \quad (16)$$

$$0.50 < fG1P/f < 3.0 \quad (17)$$

$$-9.9 < fG1P/fG1N < -1.5 \quad (18)$$

$$0.90 < fG1P/fG2P < 3.0 \quad (19)$$

The inequality (2) defines a condition regarding a total lens length LD and a focal length f of the entire optical system when the variable-magnification optical system EXT is not inserted. In other words, f is a focal length of the main optical system LM. When a value of LD/f falls below a lower limit value of the inequality (2), the total lens length becomes small, and it becomes difficult to correct on-axis chromatic aberration and chromatic aberration of magnification in a balanced manner. When the value of LD/f exceeds an upper limit value of the inequality (2), aberration correction becomes easier, but the optical system L0 and a lens barrel that holds the optical system L0 become larger in size.

The inequality (3) defines a condition regarding a distance Le from the lens surface arranged the closest to the object side in the variable-magnification optical system EXT to the image plane IP and a distance Lp from the aperture stop SP to the image plane IP. When a value of Le/Lp falls below a lower limit value of the inequality (3), an insertion/removal position of the variable-magnification optical system EXT becomes too close to the image plane IP, and an incident height of an off-axis ray that passes through the variable-magnification optical system EXT becomes large. As a result, it becomes difficult to sufficiently downsize the variable-magnification optical system EXT. When the value of Le/Lp exceeds an upper limit value of the inequality (3), the insertion/removal position of the variable-magnification optical system EXT becomes too close to the aperture stop SP, and an incident height of an on-axis ray that passes through the variable-magnification optical system EXT becomes large. Also in this case, it becomes difficult to sufficiently downsize the variable-magnification optical system EXT.

The inequality (4) defines a condition regarding a focal length fe of the variable-magnification optical system EXT and the focal length f of the entire optical system when the variable-magnification optical system EXT is not inserted. When the focal length fe of the variable-magnification optical system EXT becomes so large as to bring a value of fe/f below a lower limit value of the inequality (4), a change in magnification becomes small, which is not desirable. When the focal length fe of the variable-magnification optical system EXT becomes so small as to make the value of fe/f exceed an upper limit value of the inequality (4), it becomes difficult to sufficiently suppress a variation in various kinds of aberration such as spherical aberration before and after insertion and removal of the variable-magnification optical system EXT.

The inequality (5) defines a condition regarding a composite focal length fa of a partial optical system on the object side of a position where the variable-magnification optical system EXT is inserted in the main optical system LM and the focal length f of the entire optical system when the variable-magnification optical system EXT is not inserted. In a case where a value of fa/f falls below a lower limit value of the inequality (5), it is possible to sufficiently converge a light ray incident on the variable-magnification optical system EXT, which is advantageous in downsizing of the variable-magnification optical system EXT, but a position of the image plane IP becomes too sensitive to the insertion position of the variable-magnification optical system EXT. As a result, manufacturing becomes difficult, and thus the value of fa/f falling below the lower limit value of the inequality (5) is not desirable. When the value of fa/f exceeds an upper limit value of the inequality (5), a light ray incident on the variable-magnification optical system EXT becomes close to afocal light, and an incident height of an on-axis ray that passes through the variable-magnification optical system EXT becomes large.

As a result, it becomes difficult to sufficiently downsize the variable-magnification optical system EXT.

The inequality (6) defines a condition regarding a composite focal length fb of a partial optical system arranged on the image side of a position where the variable-magnification optical system EXT is inserted in the main optical system LM and the focal length f of the entire optical system when the variable-magnification optical system EXT is not inserted. When a value of fb/f falls below a lower limit value of the inequality (6), a focal length on the image side of the insertion position of the variable-magnification optical system EXT becomes too small, and it becomes difficult to sufficiently correct various kinds of aberration such as field curvature occurring in a lens unit on the image side of the insertion position of the variable-magnification optical system EXT. When the value of fb/f exceeds an upper limit value of the inequality (6), a focal length on the image side of the insertion position of the variable-magnification optical system EXT becomes too large, and a distance from the variable-magnification optical system EXT to the image plane IP becomes large. As a result, it becomes difficult to sufficiently downsize the optical system L0.

The inequality (7) defines a condition regarding a focal length fa on the object side of the insertion position of the variable-magnification optical system EXT in the main optical system LM and the focal length fe of the variable-magnification optical system EXT. When a value of fa/fe falls below a lower limit value of the inequality (7), a light ray incident on the variable-magnification optical system EXT becomes close to afocal light, and an incident height of an on-axis ray that passes through the variable-magnification optical system EXT becomes large. As a result, it becomes difficult to sufficiently downsize the variable-magnification optical system EXT. When the value of fa/fe exceeds an upper limit value of the inequality (7), it is possible to sufficiently converge a light ray incident on the variable-magnification optical system EXT, which is advantageous in downsizing of the variable-magnification optical system EXT, but the position of the image plane IP becomes too sensitive to the insertion position of the variable-magnification optical system EXT. As a result, manufacturing becomes difficult, and thus the value of fa/fe exceeding the upper limit value of the inequality (7) is not desirable.

The inequality (8) defines a condition regarding a focal length fb on the image side of the insertion position of the variable-magnification optical system EXT in the main optical system LM and the focal length fe of the variable-magnification optical system EXT. When a value of fb/fe falls below a lower limit value of the inequality (8), a focal length on the image side of the insertion position of the variable-magnification optical system EXT becomes too large, and a distance from the variable-magnification optical system EXT to the image plane IP becomes large. As a result, it becomes difficult to sufficiently downsize the optical system L0. When the value of fb/fe exceeds an upper limit value of the inequality (8), a focal length on the image side of the insertion position of the variable-magnification optical system EXT becomes small, and it becomes difficult to sufficiently correct various kinds of aberration such as field curvature occurring in a lens unit on the image side of the insertion position of the variable-magnification optical system EXT.

The inequality (9) defines a condition regarding a refractive index ndG1N of the negative lens G1N. Generally, the higher a refractive index of a lens material becomes, the larger a specific gravity of the lens material becomes. When a value of ndG1N falls below a lower limit value of the inequality (9), a curvature radius of a lens surface that is provided to add desired refractive power to the negative lens G1N becomes too small, and various kinds of aberration such as spherical aberration are more likely to occur. When the value of ndG1N exceeds an upper limit value of the inequality (9), the specific gravity of the negative lens G1N becomes large, and it becomes difficult to sufficiently reduce weight.

The inequality (10) defines a condition regarding an Abbe number vdG1N of the negative lens G1N.

Assuming that refractive indices of a material at the Fraunhofer d, F, and C lines (587.6 nm, 486.1 nm, and 656.3 nm, respectively) are Nd, NF, NC, respectively, an Abbe number vd of the material are defined by the following expression.

$$vd=(Nd-1)/(NF-NC)$$

When a value of vdG1N falls below a lower limit value of the inequality (10), a high dispersion glass material is used for the negative lens G1N. In this case, variations in spherical aberration at respective wavelengths tend to become large. Generally, the higher an Abbe number of a lens material becomes, the lower a refractive index of the lens material becomes. When the value of vdG1N exceeds an upper limit value of the inequality (10), the curvature radius of the negative lens G1N becomes too small to obtain sufficient refractive power for chromatic aberration correction. As a result, it becomes difficult to sufficiently correct comatic aberration.

The inequality (11) defines a condition regarding a shape factor SFG1N of the negative lens G1N positioned the closest to the object. Assuming that a curvature radius of a surface of a lens on the object side is R1 and a curvature radius of a surface of the lens on the image side is R2, the shape factor of the lens is defined by the following expression. In a case of an aspherical surface shape, a base R of the aspherical surface shape (a radius of a quadric surface serving as a reference) is used as the curvature radius.

$$SF=(R2+R1)/(R2-R1)$$

When a value of SFG1N falls below a lower limit value of the inequality (11), the curvature radius of the negative lens G1N on the object side becomes large, and it becomes difficult to sufficiently achieve both suppression of on-axis chromatic aberration and correction of comatic aberration. When the value of SFG1N exceeds an upper limit value of the inequality (11), the curvature radius of the negative lens G1N on the object side becomes small, and it becomes difficult to sufficiently correct comatic aberration.

The inequality (12) defines a condition regarding a refractive index ndG1P of a positive lens G1P positioned the closest to the object side in the optical system L0. When a value of ndG1P falls below a lower limit value of the inequality (12), a curvature radius of a surface to obtain refractive power of the lens becomes small, and various kinds of aberration such as spherical aberration occur, which is not desirable. When the value of ndG1P exceeds an upper limit value of the inequality (12), a specific gravity of the positive lens G1P becomes large and it becomes difficult to reduce weight, which is not desirable.

The inequality (13) defines a condition regarding an Abbe number vdG1P of the positive lens G1P positioned the closest to the object side in the optical system L0. When a value of vdG1P falls below a lower limit value of the inequality (13), it becomes difficult to sufficiently suppress on-axis chromatic aberration and chromatic aberration of magnification. When the value of vdG1P exceeds an upper limit value of the inequality (13), the refractive index of the positive lens G1P becomes low, and it becomes difficult to sufficiently suppress spherical aberration and comatic aberration.

The inequality (14) defines a condition regarding a refractive index ndG2P of a positive lens G2P positioned the closest to the object side among positive lenses arranged on the image side of the positive lens G1P. When a value of ndG2P falls below a lower limit value of the inequality (14), a curvature radius provided to obtain refractive power as the positive lens G2P becomes small, and various kinds of aberration such as spherical aberration are more likely to occur. When the value of ndG2P exceeds an upper limit value of the inequality (14), the specific gravity of the positive lens G2P becomes large, and it becomes difficult to sufficiently reduce weight.

The inequality (15) defines a condition regarding an Abbe number vdG2P of the positive lens G2P.

When a value of vdG2P falls below a lower limit value of the inequality (15), it becomes difficult to sufficiently suppress correct on-axis chromatic aberration and chromatic aberration of magnification. When the value of vdG2P exceeds an upper limit value of the inequality (15), a refractive index of the positive lens G2P becomes too low, and it becomes difficult to sufficiently suppress spherical aberration and comatic aberration.

The inequality (16) defines a condition regarding a focal length fG1N of the negative lens G1N and the focal length f of the entire optical system when the variable-magnification optical system EXT is not inserted. When a value of fG1N/f falls below a lower limit value of the inequality (16), power of the negative lens G1N becomes too weak, and it becomes difficult to favorably correct on-axis chromatic aberration and chromatic aberration of magnification. When the value of fG1N/f exceeds an upper limit value of the inequality (16), the power of the negative lens G1N becomes too strong, and it becomes difficult to sufficiently suppress various kinds of aberration such as spherical aberration.

The inequality (17) defines a condition regarding a focal length fG1P of the positive lens G1P positioned the closest to the object and the focal length f of the entire optical system when the variable-magnification optical system EXT is not inserted. When a value of fG1P/f falls below a lower limit value of the inequality (17), power of the positive lens G1P becomes too strong, and it becomes difficult to sufficiently suppress various kinds of aberration such as spherical aberration. When a value of fG1P/f exceeds an upper limit value of the inequality (17), the power of the positive lens G1P becomes too weak, and it becomes difficult to favorably correct on-axis chromatic aberration and chromatic aberration of magnification.

The inequality (18) defines a condition regarding the focal length fG1P of the positive lens G1P positioned the closest to the object side and the focal length fG1N of the negative lens G1N. When a value of fG1P/fG1N falls below a lower limit value of the inequality (18), the power of the positive lens G1P becomes too weak, and it becomes difficult to favorably correct on-axis chromatic aberration and chromatic aberration of magnification. When the value of fG1P/fG1N exceeds an upper limit value of the inequality (18), the power of the positive lens G1P becomes too strong, and it becomes difficult to sufficiently suppress various kinds of aberration such as spherical aberration. When the power of the positive lens G1P becomes too strong, the curvature radius of the positive lens G1P becomes small. As a result, a volume of the positive lens G1P becomes large, and it becomes difficult to sufficiently reduce weight.

The inequality (19) defines a condition regarding a focal length fG1P of the positive lens G1P positioned the closest to the object side and a focal length fG2P of the positive lens G2P arranged the closest to the object side among the positive lenses arranged on the image side of the positive lens G1P. When a value of fG1P/fG2P falls below a lower limit value of the inequality (19), the power of the positive lens G1P becomes too strong, and it becomes difficult to sufficiently suppress various kinds of aberration such as spherical aberration. When the power of the positive lens G1P becomes strong, the curvature radius of the positive lens G1P becomes small. As a result, a volume of the positive lens G1P becomes large, and it becomes difficult to sufficiently reduce weight. When the value of fG1P/fG2P exceeds an upper limit value of the inequality (19), the power of the positive lens G1P becomes too weak, and it becomes difficult to favorably correct on-axis chromatic aberration and chromatic aberration of magnification.

In one embodiment, at least one of the upper limit value and the lower limit value of each of the inequalities (2) to (19) is a value defined by a corresponding one of the following inequalities (2a) to (19a).

$$0.50<LD/f<1.15 \tag{2a}$$

$$0.45<Le/Lp<0.95 \tag{3a}$$

$$-0.75<fe/f<-0.25 \tag{4a}$$

$$1.1<fa/f<8.0 \tag{5a}$$

$$0.22<fb/f<0.85 \tag{6a}$$

$$-16<fa/fe<-2.2 \tag{7a}$$

$$-3.3<fb/fe<-0.35 \tag{8a}$$

$$1.59<ndG1N<1.87 \tag{9a}$$

$$23<vdG1N<53 \tag{10a}$$

$$-1.2<SFG1N<0.40 \tag{11a}$$

$$1.42<ndG1P<1.67 \tag{12a}$$

$$58<vdG1P<85 \tag{13a}$$

$$1.41<ndG2P<1.65 \tag{14a}$$

$$58<vdG2P<97 \tag{15a}$$

$$-0.95<fG1N/f<-0.08 \tag{16a}$$

$$0.55<fG1P/f<2.8 \tag{17a}$$

$$-9.5<fG1P/fG1N<-1.7 \tag{18a}$$

$$0.95<fG1P/fG2P<2.8 \tag{19a}$$

In another embodiment, at least one of the upper limit value and the lower limit value of each of the inequalities (2) to (19) is more a value defined by a corresponding one of the following inequalities (2b) to (19b).

$$0.60<LD/f<1.10 \tag{2b}$$

$$0.50<Le/Lp<0.90 \tag{3b}$$

$$-0.70<fe/f<-0.30 \tag{4b}$$

$$1.2<fa/f<7.0 \tag{5b}$$

$$0.25<fb/f<0.80 \tag{6b}$$

$$-14<fa/fe<-2.5 \tag{7b}$$

$$-3.0<fb/fe<-0.40 \tag{8b}$$

$$1.60<ndG1N<1.86 \tag{9b}$$

$$24<vdG1N<50 \tag{10b}$$

$$-1.1<SFG1N<0.30 \tag{11b}$$

$1.43 < ndG1P < 1.65$ (12b)

$60 < vdG1P < 82$ (13b)

$1.42 < ndG2P < 1.63$ (14b)

$60 < vdG2P < 96$ (15b)

$-0.90 < fG1N/f < -0.10$ (16b)

$0.60 < fG1P/f < 2.5$ (17b)

$-9.0 < fG1P/fG1N < -2.0$ (18b)

$1.0 < fG1P/fG2P < 2.5$ (19b)

A configuration that is satisfied by the optical system L0 according to each of the embodiments will now be described.

In one embodiment, the variable-magnification optical system EXT is configured to include two or more negative lenses and one or more positive lenses. This configuration can prevent a Petzval sum from becoming an extremely negative value, and can favorably correct field curvature.

In the optical system L0 according to each of the embodiments, part of lenses in the main optical system LM may be an image-stabilizing lens unit that is driven in a direction perpendicular to the optical axis. In this case, since an effective diameter of a lens on the image side of the aperture stop SP tends to be small, the image-stabilizing lens unit is arranged at a position on the image side of the aperture stop SP. This can simplify a holding mechanism that holds the image-stabilizing lens unit and a driving mechanism that drives the image-stabilizing lens unit, and can thereby reduce the weight of the lens apparatus including the optical system L0.

In another embodiment, the variable-magnification optical system EXT is removably inserted between lenses included in the main optical system LM. That is, the variable-magnification optical system EXT is inserted into and removed from a position that is not the closest to the image side in the main optical system LM. This can further reduce a diameter of the variable-magnification optical system EXT.

A lens unit that is moved at the time of focusing may be moved in response to insertion and removal of the variable-magnification optical system EXT. While a focusing position may change as a result of insertion and removal of the variable-magnification optical system EXT, appropriately moving a focus lens unit can reduce a change in in-focus position resulting from insertion and removal of the variable-magnification optical system EXT.

In yet another embodiment, the variable-magnification optical system EXT includes a positive single lens arranged the closest to the object side. The variable-magnification optical system EXT includes at least one cemented lens. At least one cemented lens can be a cemented lens obtained by cementing a positive lens and a negative lens, a cemented lens obtained by cementing a negative lens, a positive lens, and a negative lens, or a cemented lens obtained by cementing a positive lens and a negative lens. The variable-magnification optical system EXT may include all of these cemented lenses. Arranging at least one cemented lens in the variable-magnification optical system EXT can enhance ease of manufacturing while reducing chromatic aberration.

The variable-magnification optical system EXT in the optical system L0 according to the first embodiment consists of a positive lens, a cemented lens obtained by cementing a positive lens and a negative lens, a cemented lens obtained by cementing a negative lens, a positive lens, and a negative lens, and a cemented lens obtained by cementing a positive lens and a negative lens. These lenses are sequentially arranged in the order from the object side to the image side.

The variable-magnification optical system EXT in the optical system L0 according to the second embodiment consists of a positive lens, a cemented lens obtained by cementing a positive lens and a negative lens, a cemented lens obtained by cementing a negative lens, a positive lens, and a negative lens, and a cemented lens obtained by cementing a positive lens and a negative lens. These lenses are sequentially arranged in the order from the object side to the image side.

The variable-magnification optical system EXT in the optical system L0 according to the third embodiment consists of a positive lens, a cemented lens obtained by cementing a positive lens and a negative lens, a cemented lens obtained by cementing a negative lens, a positive lens, and a negative lens, and a cemented lens obtained by cementing a positive lens and a negative lens. These lenses are sequentially arranged in the order from the object side to the image side.

First to third numerical embodiments corresponding to the first to third embodiments, respectively, will be described.

In each of the numerical embodiments, each plane of the optical system is denoted by a surface number i (i is a natural number) from the object side. In each of the numerical embodiments, r is a curvature radius (mm) of each surface, d is a lens thickness on the optical axis or a distance (air interval) (mm) between a surface having the surface number i and a surface having a surface number (i+1), nd is a refractive index at the d-line of a material of an optical member having each surface. In each of the numerical embodiments, vd is an Abbe number at the d-line of the material of the optical member having each surface.

A focal length (mm), an F-number, and a half angle of field (°) are values in a state where the optical system focuses on an object at infinity. A total lens length is a length obtained by adding a back focus SK to a distance on the optical axis from a foremost surface (lens surface arranged the closest to the object side) to an end surface (lens surface arranged the closest to the image side) in the optical system.

The back focus SK is a distance from the end surface in the optical system to the image plane IP.

Table 1 indicates values corresponding to the above-mentioned inequalities (1) to (19) in the first to third numerical embodiments.

The back focus SK is an air conversion distance from the end surface in the optical system to the image plane IP.

[First Numerical Example]

<Optical System (Main Optical System) in State Where Variable-Magnification Optical System Is Not Inserted>
Unit mm
Surface data

| Surface Number | r | d | nd | vd |
|---|---|---|---|---|
| 1 | 443.570 | 8.20 | 1.48749 | 70.2 |
| 2 | −1502.142 | 0.10 | | |
| 3 | 227.620 | 12.00 | 1.43387 | 95.1 |
| 4 | 1755.996 | 97.18 | | |
| 5 | 173.310 | 11.00 | 1.43387 | 95.1 |
| 6 | −251.525 | 0.11 | | |
| 7 | −260.995 | 2.90 | 1.67300 | 38.3 |
| 8 | 261.833 | 59.16 | | |
| 9 | 79.404 | 6.60 | 1.92286 | 20.9 |
| 10 | 737.207 | 0.14 | | |
| 11 | 585.117 | 1.70 | 2.00069 | 25.5 |
| 12 | 52.050 | 8.90 | 1.49700 | 81.5 |
| 13 | 325.993 | (variable) | | |
| 14 | 73.892 | 6.20 | 1.49700 | 81.5 |
| 15 | −10892.169 | (variable) | | |
| 16 | 742.447 | 1.80 | 1.75500 | 52.3 |
| 17 | 63.613 | (variable) | | |
| 18(stop) | ∞ | 7.09 | | |
| 19 | 250.640 | 1.80 | 1.51742 | 52.4 |
| 20 | 51.522 | 3.81 | | |
| 21 | −330.459 | 4.07 | 1.75211 | 25.0 |
| 22 | −59.091 | 1.80 | 1.49700 | 81.5 |
| 23 | 55.745 | 4.60 | | |
| 24 | 87.576 | 3.80 | 1.49700 | 81.5 |
| 25 | −198.126 | 40.26 | | |
| 26 | 528.989 | 5.50 | 1.51742 | 52.4 |
| 27 | −57.284 | 5.00 | | |
| 28 | ∞ | 1.50 | 1.51633 | 64.1 |
| 29 | ∞ | 5.42 | | |
| 30 | −351.519 | 1.50 | 1.49700 | 81.5 |
| 31 | 43.426 | 8.80 | 1.72916 | 54.7 |
| 32 | −141.620 | 5.35 | | |
| 33 | −97.918 | 1.50 | 1.96300 | 24.1 |
| 34 | 212.566 | 53.83 | | |
| Image plane | ∞ | | | |

Various kinds of data

| | |
|---|---|
| Focal length | 389.00 |
| F-number | 2.91 |
| Half angle of view (°) | 3.18 |
| Image height | 21.64 |
| Total lens length | 406.00 |
| BF | 53.83 |
| d13 | 12.82 |
| d15 | 2.00 |
| d17 | 19.58 |

<Optical System in State Where Variable-Magnification Optical System Is Inserted>
Unit mm
Surface data

| Surface Number | r | d | nd | vd |
|---|---|---|---|---|
| 1 | 443.570 | 8.20 | 1.48749 | 70.2 |
| 2 | −1502.142 | 0.10 | | |
| 3 | 227.620 | 12.00 | 1.43387 | 95.1 |
| 4 | 1755.996 | 97.18 | | |
| 5 | 173.310 | 11.00 | 1.43387 | 95.1 |
| 6 | −251.525 | 0.11 | | |
| 7 | −260.995 | 2.90 | 1.67300 | 38.3 |
| 8 | 261.833 | 59.16 | | |
| 9 | 79.404 | 6.60 | 1.92286 | 20.9 |
| 10 | 737.207 | 0.14 | | |
| 11 | 585.117 | 1.70 | 2.00069 | 25.5 |
| 12 | 52.050 | 8.90 | 1.49700 | 81.5 |
| 13 | 325.993 | (variable) | | |
| 14 | 73.892 | 6.20 | 1.49700 | 81.5 |
| 15 | −10892.169 | (variable) | | |
| 16 | 742.447 | 1.80 | 1.75500 | 52.3 |
| 17 | 63.613 | (variable) | | |
| 18 (stop) | ∞ | 7.09 | | |

[First Numerical Example]

| | | | | |
|---|---|---|---|---|
| 19 | 250.640 | 1.80 | 1.51742 | 52.4 |
| 20 | 51.522 | 3.81 | | |
| 21 | −330.459 | 4.07 | 1.75211 | 25.0 |
| 22 | −59.091 | 1.80 | 1.49700 | 81.5 |
| 23 | 55.745 | 4.60 | | |
| 24 | 87.576 | 3.80 | 1.49700 | 81.5 |
| 25 | −198.126 | 2.00 | | |
| 26 | 30.159 | 5.00 | 1.49700 | 81.5 |
| 27 | −605.295 | 0.30 | | |
| 28 | 120.765 | 1.82 | 1.59282 | 68.6 |
| 29 | 206.372 | 1.15 | 1.83400 | 37.2 |
| 30 | 34.364 | 9.75 | | |
| 31 | −446.680 | 0.95 | 1.83481 | 42.7 |
| 32 | 23.747 | 8.90 | 1.71736 | 29.5 |
| 33 | −28.370 | 0.95 | 1.75500 | 52.3 |
| 34 | 82.953 | 1.03 | | |
| 35 | 63.608 | 5.36 | 1.85451 | 25.2 |
| 36 | −40.564 | 1.05 | 1.95906 | 17.5 |
| 37 | 1592.914 | 2.00 | | |
| 38 | 528.989 | 5.50 | 1.51742 | 52.4 |
| 39 | −57.284 | 5.00 | | |
| 40 | ∞ | 1.50 | 1.51633 | 64.1 |
| 41 | ∞ | 5.42 | | |
| 42 | −351.519 | 1.50 | 1.49700 | 81.5 |
| 43 | 43.426 | 8.80 | 1.72916 | 54.7 |
| 44 | −141.620 | 5.35 | | |
| 45 | −97.918 | 1.50 | 1.96300 | 24.1 |
| 46 | 212.566 | 53.83 | | |
| Image plane | ∞ | | | |

Various kinds of data

| | |
|---|---|
| Focal length | 544.00 |
| F-number | 4.19 |
| Half angle of view (°) | 2.28 |
| Image height | 21.64 |
| Total lens length | 406.01 |
| BF | 53.83 |
| d13 | 11.54 |
| d15 | 8.40 |
| d17 | 14.46 |

Lens unit data

| Unit | Starting surface | Focal length |
|---|---|---|
| 1 | 1 | 290.40 |
| 2 | 14 | 147.70 |
| 3 | 16 | −92.26 |
| 4 | 18 | −169.51 |
| 5 | 26 | −199.87 |
| 6 | 38 | 135.82 |

[Second Numerical Example]

<Optical System (Main Optical System) in State Where Variable-Magnification Optical System Is Not Inserted>
Unit mm
Surface data

| Surface Number | r | d | nd | vd |
|---|---|---|---|---|
| 1 | 471.114 | 6.00 | 1.48749 | 70.2 |
| 2 | 1760.840 | 0.10 | | |
| 3 | 322.972 | 8.00 | 1.49700 | 81.5 |
| 4 | 1400.852 | 0.10 | | |
| 5 | 245.037 | 11.00 | 1.43387 | 95.1 |
| 6 | 989.532 | 89.45 | | |
| 7 | 174.097 | 11.00 | 1.43387 | 95.1 |
| 8 | −331.734 | 0.11 | | |
| 9 | −356.387 | 2.90 | 1.61340 | 44.3 |
| 10 | 134.086 | 71.24 | | |
| 11 | 130.092 | 5.40 | 1.86966 | 20.0 |
| 12 | 317.855 | 0.14 | | |

[Second Numerical Example]

| | | | | |
|---|---:|---:|---:|---:|
| 13 | 214.727 | 1.70 | 2.00069 | 25.5 |
| 14 | 79.631 | 8.90 | 1.49700 | 81.5 |
| 15 | 631.283 | (variable) | | |
| 16 | 95.682 | 6.20 | 1.49700 | 81.5 |
| 17 | −5591.123 | (variable) | | |
| 18 | −1600.590 | 1.80 | 1.72916 | 54.7 |
| 19 | 96.670 | (variable) | | |
| 20(stop) | ∞ | 7.09 | | |
| 21 | 111.583 | 1.80 | 1.75500 | 52.3 |
| 22 | 46.851 | 3.81 | | |
| 23 | −213.812 | 4.06 | 1.77047 | 29.7 |
| 24 | −49.407 | 1.80 | 1.49700 | 81.5 |
| 25 | 75.645 | 4.60 | | |
| 26 | 55.135 | 3.80 | 1.80810 | 22.8 |
| 27 | 108.917 | 40.26 | | |
| 28 | 58.249 | 5.50 | 1.51633 | 64.1 |
| 29 | −95.700 | 5.00 | | |
| 30 | ∞ | 1.50 | 1.51633 | 64.1 |
| 31 | ∞ | 2.65 | | |
| 32 | −2507.527 | 1.50 | 1.59522 | 67.7 |
| 33 | 29.558 | 8.80 | 1.51633 | 64.1 |
| 34 | −57.500 | 1.51 | | |
| 35 | −45.670 | 1.50 | 1.77830 | 23.9 |
| 36 | 996.155 | 81.91 | | |
| Image plane | ∞ | | | |

Various kinds of data

| | |
|---|---:|
| Focal length | 582.00 |
| F-number | 4.12 |
| Half angle of view (°) | 2.13 |
| Image height | 21.64 |
| Total lens length | 486.10 |
| BF | 81.91 |
| d15 | 19.60 |
| d17 | 2.00 |
| d19 | 63.39 |

<Optical System in State Where Variable-Magnification Optical System Is Inserted>
Unit mm
Surface data

| Surface Number | r | d | nd | vd |
|---|---:|---:|---:|---:|
| 1 | 471.114 | 6.00 | 1.48749 | 70.2 |
| 2 | 1760.840 | 0.10 | | |
| 3 | 322.972 | 8.00 | 1.49700 | 81.5 |
| 4 | 1400.852 | 0.10 | | |
| 5 | 245.037 | 11.00 | 1.43387 | 95.1 |
| 6 | 989.532 | 89.45 | | |
| 7 | 174.097 | 11.00 | 1.43387 | 95.1 |
| 8 | −331.734 | 0.11 | | |
| 9 | −356.387 | 2.90 | 1.61340 | 44.3 |
| 10 | 134.086 | 71.24 | | |
| 11 | 130.092 | 5.40 | 1.86966 | 20.0 |
| 12 | 317.855 | 0.14 | | |
| 13 | 214.727 | 1.70 | 2.00069 | 25.5 |
| 14 | 79.631 | 8.90 | 1.49700 | 81.5 |
| 15 | 631.283 | (variable) | | |
| 16 | 95.682 | 6.20 | 1.49700 | 81.5 |
| 17 | −5591.123 | (variable) | | |
| 18 | −1600.590 | 1.80 | 1.72916 | 54.7 |
| 19 | 96.670 | (variable) | | |
| 20(stop) | ∞ | 7.09 | | |
| 21 | 111.583 | 1.80 | 1.75500 | 52.3 |
| 22 | 46.851 | 3.81 | | |
| 23 | −213.812 | 4.06 | 1.77047 | 29.7 |
| 24 | −49.407 | 1.80 | 1.49700 | 81.5 |
| 25 | 75.645 | 4.60 | | |
| 26 | 55.135 | 3.80 | 1.80810 | 22.8 |
| 27 | 108.917 | 2.00 | | |
| 28 | 28.202 | 8.05 | 1.49700 | 81.5 |
| 29 | −218.478 | 0.30 | | |
| 30 | 224.895 | 4.82 | 1.63930 | 44.9 |
| 31 | −44.418 | 1.15 | 1.72916 | 54.7 |
| 32 | 28.436 | 7.01 | | |
| 33 | −558.701 | 0.95 | 1.83481 | 42.7 |

-continued

| [Second Numerical Example] | | | | |
|---|---|---|---|---|
| 34 | 23.736 | 6.71 | 1.63980 | 34.5 |
| 35 | −37.643 | 0.95 | 1.59522 | 67.7 |
| 36 | 108.150 | 1.24 | | |
| 37 | 53.148 | 4.03 | 1.72825 | 28.5 |
| 38 | −47.560 | 1.05 | 1.95906 | 17.5 |
| 39 | −731.126 | 2.00 | | |
| 40 | 58.249 | 5.50 | 1.51633 | 64.1 |
| 41 | −95.700 | 5.00 | | |
| 42 | ∞ | 1.50 | 1.51633 | 64.1 |
| 43 | ∞ | 2.65 | | |
| 44 | −2507.527 | 1.50 | 1.59522 | 67.7 |
| 45 | 29.558 | 8.80 | 1.51633 | 64.1 |
| 46 | −57.500 | 1.51 | | |
| 47 | −45.670 | 1.50 | 1.77830 | 23.9 |
| 48 | 996.155 | 81.91 | | |
| Image plane | ∞ | | | |

| Various kinds of data | |
|---|---|
| Focal length | 814.80 |
| F-number | 5.88 |
| Half angle of view (°) | 1.52 |
| Image height | 21.64 |
| Total lens length | 486.10 |
| BF | 81.91 |
| d15 | 17.65 |
| d17 | 6.73 |
| d19 | 60.60 |

[Third Numerical Example]

<Optical System (Main Optical System) in State Where Variable-Magnification Optical System Is Not Inserted>
Unit mm
Surface data

| Surface Number | r | d | nd | vd |
|---|---|---|---|---|
| 1 | 141.008 | 11.19 | 1.59349 | 67.0 |
| 2 | 1282.754 | 97.18 | | |
| 3 | 77.593 | 8.14 | 1.49700 | 81.5 |
| 4 | −987.708 | 0.67 | | |
| 5 | −476.470 | 1.80 | 1.85451 | 25.2 |
| 6 | 70.845 | 0.15 | | |
| 7 | 55.636 | 8.74 | 1.43387 | 95.1 |
| 8 | −4252.064 | 2.00 | | |
| 9 | 59.636 | 5.45 | 1.92286 | 20.9 |
| 10 | 209.603 | 1.04 | | |
| 11 | 461.866 | 1.70 | 1.75500 | 52.3 |
| 12 | 33.933 | 8.90 | 1.43875 | 94.7 |
| 13 | 323.847 | 3.31 | | |
| 14(stop) | ∞ | (variable) | | |
| 15 | −985.903 | 1.30 | 1.59349 | 67.0 |
| 16 | 58.442 | (variable) | | |
| 17 | 1420.368 | 1.20 | 1.95906 | 17.5 |
| 18 | 93.617 | 3.81 | | |
| 19 | −90.465 | 3.00 | 1.51633 | 64.1 |
| 20 | −56.920 | 1.20 | 1.51742 | 52.4 |
| 21 | 1426.553 | 4.60 | | |
| 22 | 233.160 | 3.80 | 1.77830 | 23.9 |
| 23 | −79.655 | 49.56 | | |
| 24 | 136.777 | 5.50 | 1.53172 | 48.8 |
| 25 | −79.822 | 2.00 | | |
| 26 | ∞ | 1.50 | 1.51633 | 64.1 |
| 27 | ∞ | 4.85 | | |
| 28 | −113.057 | 1.50 | 1.49700 | 81.5 |
| 29 | 43.851 | 6.20 | 1.75500 | 52.3 |
| 30 | −1059.672 | 3.13 | | |
| 31 | −137.877 | 1.50 | 1.77830 | 23.9 |
| 32 | 231.852 | 49.68 | | |
| Image plane | ∞ | | | |

-continued

| [Third Numerical Example] |
|---|

| Various kinds of data | |
|---|---|
| Focal length | 300.00 |
| F-number | 2.91 |
| Half angle of view (°) | 4.12 |
| Image height | 21.64 |
| Total lens length | 320.00 |
| BF | 49.68 |
| d14 | 2.00 |
| d16 | 23.40 |
| d23 | 49.56 |

<Optical System in State Where Variable-Magnification Optical System Is Inserted>
Unit mm
Surface data

| Surface Number | r | d | nd | vd |
|---|---|---|---|---|
| 1 | 141.008 | 11.19 | 1.59349 | 67.0 |
| 2 | 1282.754 | 97.18 | | |
| 3 | 77.593 | 8.14 | 1.49700 | 81.5 |
| 4 | −987.708 | 0.67 | | |
| 5 | −476.470 | 1.80 | 1.85451 | 25.2 |
| 6 | 70.845 | 0.15 | | |
| 7 | 55.636 | 8.74 | 1.43387 | 95.1 |
| 8 | −4252.064 | 2.00 | | |
| 9 | 59.636 | 5.45 | 1.92286 | 20.9 |
| 10 | 209.603 | 1.04 | | |
| 11 | 461.866 | 1.70 | 1.75500 | 52.3 |
| 12 | 33.933 | 8.90 | 1.43875 | 94.7 |
| 13 | 323.847 | 3.31 | | |
| 14(stop) | ∞ | (variable) | | |
| 15 | −985.903 | 1.30 | 1.59349 | 67.0 |
| 16 | 58.442 | (variable) | | |
| 17 | 1420.368 | 1.20 | 1.95906 | 17.5 |
| 18 | 93.617 | 3.81 | | |
| 19 | −90.465 | 3.00 | 1.51633 | 64.1 |
| 20 | −56.920 | 1.20 | 1.51742 | 52.4 |
| 21 | 1426.553 | 4.60 | | |
| 22 | 233.160 | 3.80 | 1.77830 | 23.9 |
| 23 | −79.655 | 2.00 | | |
| 24 | 35.477 | 5.01 | 1.49700 | 81.5 |
| 25 | 1767.349 | 0.30 | | |
| 26 | 100.332 | 2.14 | 1.51742 | 52.4 |
| 27 | 228.702 | 1.15 | 1.75500 | 52.3 |
| 28 | 43.892 | 22.29 | | |
| 29 | −331.482 | 0.95 | 1.91082 | 35.3 |
| 30 | 25.138 | 7.45 | 1.66565 | 35.6 |
| 31 | −24.346 | 0.95 | 1.72916 | 54.7 |
| 32 | 50.780 | 0.14 | | |
| 33 | 46.762 | 4.13 | 1.85478 | 24.8 |
| 34 | −52.455 | 1.05 | 1.95906 | 17.5 |
| 35 | −524.464 | 2.00 | | |
| 36 | 136.777 | 5.50 | 1.53172 | 48.8 |
| 37 | −79.822 | 2.00 | | |
| 38 | ∞ | 1.50 | 1.51633 | 64.1 |
| 39 | ∞ | 4.85 | | |
| 40 | −113.057 | 1.50 | 1.49700 | 81.5 |
| 41 | 43.851 | 6.20 | 1.75500 | 52.3 |
| 42 | −1059.672 | 3.13 | | |
| 43 | −137.877 | 1.50 | 1.77830 | 23.9 |
| 44 | 231.852 | 49.68 | | |
| Image plane | ∞ | | | |

| Various kinds of data | |
|---|---|
| Focal length | 420.00 |
| F-number | 4.12 |
| Half angle of view (°) | 2.95 |
| Image height | 21.64 |
| Total lens length | 320.00 |
| BF | 49.68 |
| d14 | 6.00 |
| d16 | 19.41 |

The following tables indicate various values in the embodiments.

TABLE 1

|  | First embodiment | Second embodiment | Third embodiment |
| --- | --- | --- | --- |
| LD | 406.01 | 486.10 | 320.00 |
| D1N | 128.59 | 125.76 | 117.18 |
| f | 389.00 | 582.00 | 300.00 |
| Le | 126.66 | 148.13 | 123.42 |
| Lp | 155.63 | 177.08 | 169.73 |
| fe | −199.87 | −303.63 | −189.72 |
| fa | 744.30 | 1245.59 | 472.55 |
| fb | 135.82 | 185.36 | 198.53 |
| ndG1N | 1.67 | 1.61 | 1.85 |
| vdG1N | 38.26 | 44.27 | 25.16 |
| SFG1N | 0.00 | −0.45 | −0.74 |
| ndG1P | 1.49 | 1.49 | 1.59 |
| vdG1P | 70.23 | 70.23 | 67.00 |
| ndG2P | 1.43 | 1.43 | 1.50 |
| vdG2P | 95.10 | 95.10 | 81.54 |
| fG1N | −193.78 | −158.48 | −72.07 |
| fG1P | 703.44 | 1317.41 | 265.96 |
| fG2P | 601.33 | 842.49 | 145.12 |
| (1) | 0.32 | 0.26 | 0.37 |
| (2) | 1.04 | 0.84 | 1.07 |
| (3) | 0.81 | 0.84 | 0.73 |
| (4) | −0.51 | −0.52 | −0.63 |
| (5) | 1.91 | 2.14 | 1.58 |
| (6) | 0.35 | 0.32 | 0.66 |
| (7) | −3.72 | −4.10 | −2.49 |
| (8) | −0.68 | −0.61 | −1.05 |
| (9) | 1.67 | 1.61 | 1.85 |
| (10) | 38.26 | 44.27 | 25.16 |
| (11) | 0.00 | −0.45 | −0.75 |
| (12) | 1.49 | 1.49 | 1.59 |
| (13) | 70.23 | 70.23 | 67.00 |
| (14) | 1.43 | 1.43 | 1.50 |
| (15) | 95.10 | 95.10 | 81.54 |
| (16) | −0.50 | −0.27 | −0.24 |
| (17) | 1.81 | 2.26 | 0.89 |
| (18) | −3.63 | −8.31 | −3.69 |
| (19) | 1.17 | 1.56 | 1.83 |

[Lens Apparatus]

Figure 13:
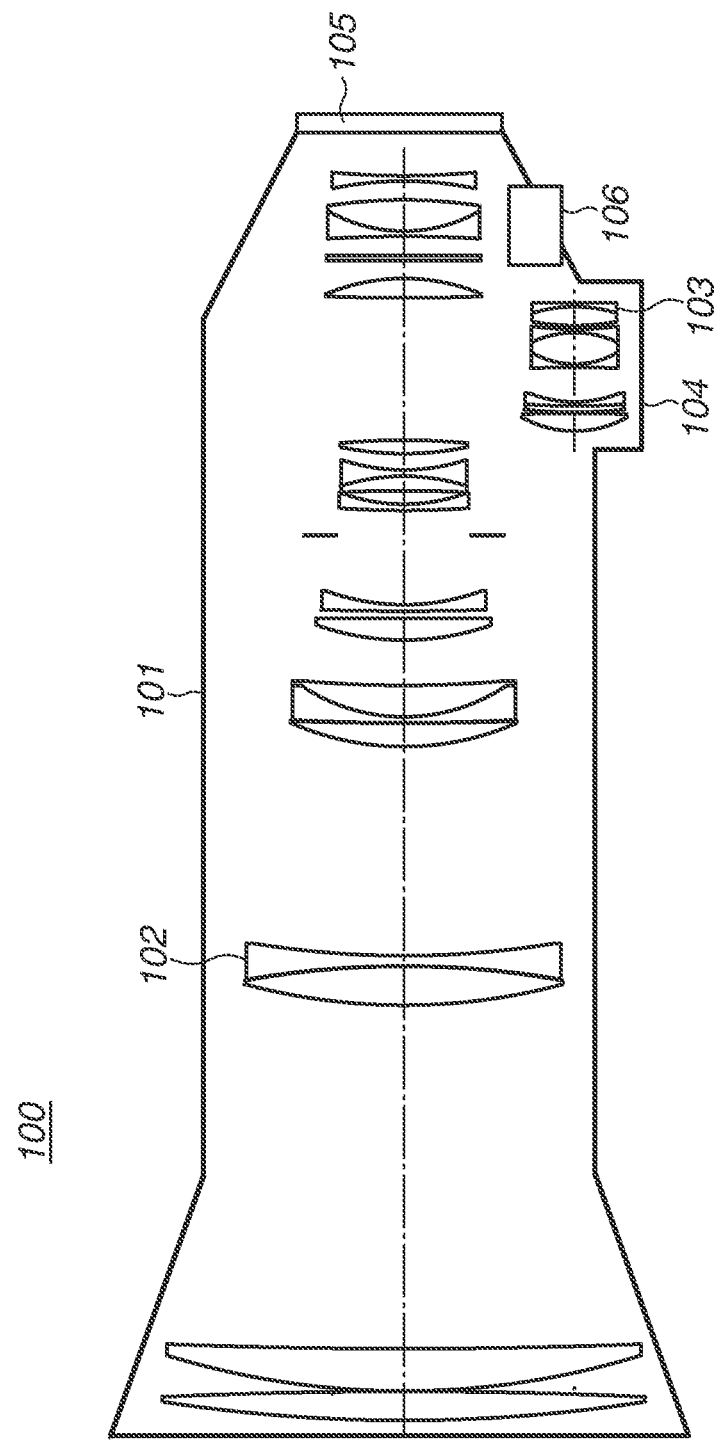
FIG. 13 is a schematic view illustrating a lens apparatus.

An embodiment of a lens apparatus 100 using the optical system of the disclosure will be described with reference to FIG. 13. The lens apparatus 100 is an interchangeable lens apparatus in an interchangeable lens camera system.

The lens apparatus 100 includes a main optical system 102, a variable-magnification optical system 103, a lens barrel 101 that holds the main optical system 102 and the variable-magnification optical system 103, and a mount unit 105 for coupling the lens apparatus 100 to a camera main body. The main optical system 102 and the variable-magnification optical system 103 have the features described in the first to third embodiments, and satisfy at least the inequality (1).

Since the main optical system 102 and the variable-magnification optical system 103 included in the lens apparatus 100 according to the present embodiment have features similar to those of any one of the first to third embodiments, it is possible to obtain favorable optical characteristics while achieving reduction in weight of the entire system.

The lens barrel 101 includes a retracting portion 104 constituting a retracting space for retracting the variable-magnification optical system 103 from the optical path of the main optical system 102. The lens barrel 101 can include a plurality of lens holding members, a movement mechanism for a focus lens, various kinds of operation buttons, and an operation ring, which are not illustrated. The retracting portion 104 may be configured to be raised from its surrounding portion. In this case, the lens apparatus 100 can be configured to be downsized.

The lens barrel 101 includes an operation unit 106 for inserting/removing the variable-magnification optical system 103 into/from the optical path of the main optical system 102. A user can insert/remove the variable-magnification optical system 103 into/from the optical path of the main optical system 102 by operating the operation unit 106. The operation unit 106 is composed of, for example, a lever-like member. In one embodiment, the operation unit 106 is arranged at a position closer to the mount unit 105 than the retracting portion 104 in the optical axis direction. This can enhance the operability of the lens apparatus 100 for the user.

[Image Pickup Apparatus]

Figure 14:
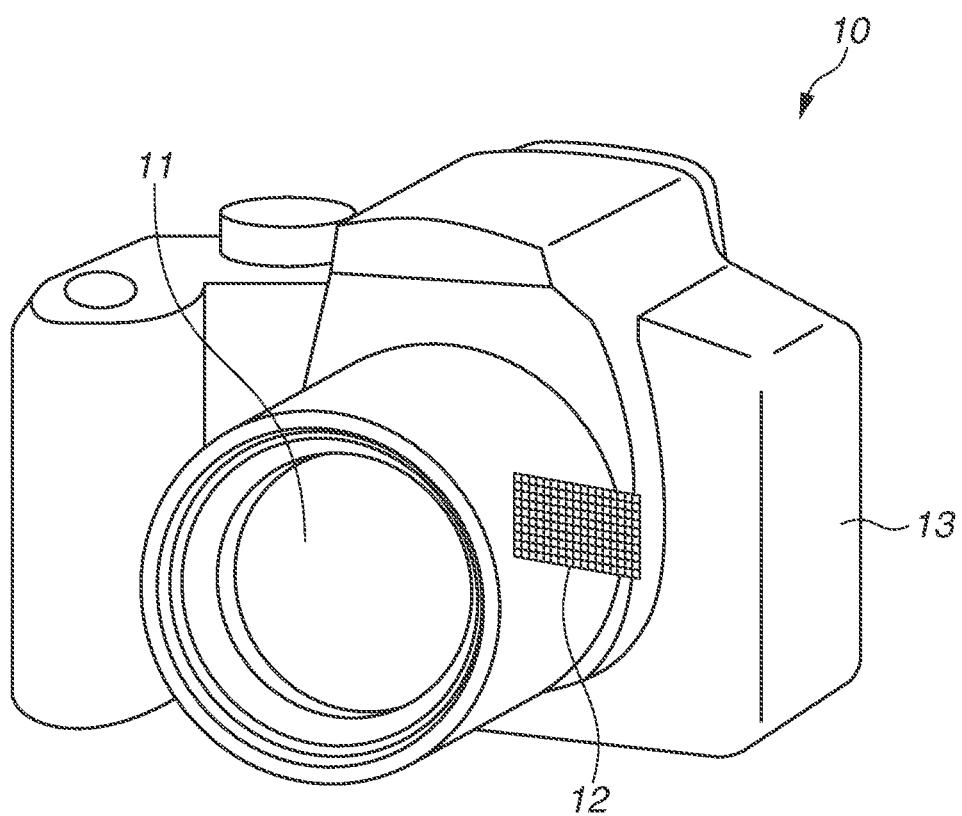
FIG. 14 is a schematic view illustrating an image pickup apparatus.

An embodiment of a digital still camera (image pickup apparatus) employing the optical system of the disclosure will be described with reference to FIG. 14. FIG. 14 illustrates a camera main body 10, and a lens apparatus 11 including the optical system L0 described in any one of the first to third embodiments. The lens apparatus 11 is provided with a space for retracting the variable-magnification optical system EXT of the optical system L0 from the optical path of the main optical system LM, and an operation member (such as a lever) for inserting/removing the variable-magnification optical system EXT from/into the main optical system LM.

A solid-state image pickup element (photoelectric conversion element) 12, such as a charge-coupled device (CCD) sensor and a complementary metal-oxide semiconductor (CMOS) sensor, is incorporated in the camera main body 10, receives light of an optical image formed by the lens apparatus 11, and photoelectrically converts the optical image. The camera main body 10 may be a single-lens reflex camera having a quick turn mirror, or a mirror-less camera body without the quick turn mirror.

In this manner, applying the optical system L0 of the aspect of the embodiments to the image pickup apparatus such as the digital still camera enables obtaining of favorable optical characteristics while achieving a reduction in weight of the entire system in the configuration capable of inserting/removing the variable-magnification optical system EXT.

While the description has been given of the exemplary embodiments and embodiments, the disclosure is not limited to these exemplary embodiments and embodiments, and can be combined, modified, and changed in various manners without departing from the scope of the disclosure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-043282, filed Mar. 17, 2021, which is hereby incorporated by reference herein in its entirety.

What is claimed is:

1. An optical system, comprising:
   a main optical system including an aperture stop; and
   a variable-magnification optical system configured to be removably inserted between the aperture stop and an image plane,
   wherein a distance from a lens surface that is the closest to an object side in the main optical system to the image plane is constant before and after insertion and removal of the variable-magnification optical system,
   wherein the main optical system includes a plurality of positive lenses and a plurality of negative lenses, and wherein the following inequalities are satisfied:

$0.20 < D1N/LD < 0.50$, and $0.40 < Le/Lp < 0.97$, where D1N is a distance from the lens surface that is the closest to the object side in the main optical system to a lens surface of a negative lens G1N that is the closest to the object side among the plurality of negative lenses, and LD is a distance from the lens surface that is the closest to the object side in the main optical system to the image plane, Le is a distance from a lens surface that is the closest to the object side in the variable-magnification optical system to the image plane, and Lp is a distance from the aperture stop to the image plane.

2. The optical system according to claim 1, wherein the following inequality is satisfied:

$0.40 < LD/f < 1.20$, where f is a focal length of the main optical system.

3. The optical system according to claim 1, wherein the following inequality is satisfied:

$-0.80 < fe/f < -0.20$, where fe is a focal length of the variable-magnification optical system, and f is a focal length of the main optical system.

4. The optical system according to claim 1, wherein the following inequality is satisfied:

$1.0 < fa/f < 9.0$, where fa is a focal length of a partial optical system that is arranged on the object side of an insertion position of the variable-magnification optical system in the main optical system, and f is a focal length of the main optical system.

5. The optical system according to claim 1, wherein the following inequality is satisfied:

$0.20 < fb/f < 0.90$, where fb is a focal length of a partial optical system that is arranged on an image side of an insertion position of the variable-magnification optical system in the main optical system, and f is a focal length of the main optical system.

6. The optical system according to claim 1, wherein the following inequality is satisfied:

$-18 < fa/fe < -2.0$, where fa is a focal length of a partial optical system that is arranged on the object side of an insertion position of the variable-magnification optical system in the main optical system, and fe is a focal length of the variable-magnification optical system.

7. The optical system according to claim 1, wherein the following inequality is satisfied:

$-3.5 < fb/fe < -0.30$, where fb is a focal length of a partial optical system that is arranged on the image side of an insertion position of the variable-magnification optical system in the main optical system, and fe is a focal length of the variable-magnification optical system.

8. The optical system according to claim 1, wherein the following inequality is satisfied:

$1.58 < ndG1N < 1.89$, where ndG1N is a refractive index of the negative lens G1N.

9. The optical system according to claim 1, wherein the following inequality is satisfied:

$22 < vdG1N < 55$, where vdG1N is an Abbe number of the negative lens G1N.

10. The optical system according to claim 1, wherein the following inequality is satisfied:

$-1.3 < SFG1N < 0.50$, where SFG1N is a shape factor of the negative lens G1N.

11. The optical system according to claim 1, wherein the following inequality is satisfied:

$1.41 < ndG1P < 1.69$, where ndG1P is a refractive index of a positive lens G1P that is arranged the closest to the object side in the main optical system.

12. The optical system according to claim 1, wherein the following inequality is satisfied:

$55 < vdG1P < 95$, where vdG1P is an Abbe number of a positive lens G1P that is arranged the closest to the object in the main optical system.

13. The optical system according to claim 1, wherein the following inequality is satisfied:

$1.40 < ndG2P < 1.67$, where ndG2P is a refractive index of a positive lens G2P that is arranged the closest to the object side, among positive lenses arranged on an image side of a positive lens G1P that is arranged the closest to the object side in the main optical system.

14. The optical system according to claim 1, wherein the following inequality is satisfied:

$55 < vdG2P < 99$, where vdG2P is an Abbe number of a positive lens G2P that is arranged the closest to the object side among positive lenses arranged on an image side of a positive lens G1P that is arranged the closest to the object side in the main optical system.

15. The optical system according to claim 1, wherein the following inequality is satisfied:

$-0.95 < fG1N/f < -0.08$, where fG1N is a focal length of the negative lens G1N, and f is a focal length of the main optical system.

16. The optical system according to claim 1, wherein the following inequality is satisfied:

$0.50 < fG1P/f < 3.0$, where fG1P is a focal length of a positive lens G1P that is arranged the closest to the object side in the main optical system, and f is a focal length of the main optical system.

17. The optical system according to claim 1, wherein the following inequality is satisfied:

$-9.9 < fG1P/fG1N < -1.5$, where fG1P is a focal length of a positive lens G1P that is arranged the closest to the object side in the main optical system, and fG1N is a focal length of the negative lens G1N.

18. The optical system according to claim 1, wherein the following inequality is satisfied:

0.90<fG1P/fG2P<3.0, where fG1P is a focal length of a positive lens G1P that is arranged the closest to the object side in the main optical system, and fG2P is a focal length of a positive lens G2P that is arranged the closest to the object side among positive lenses arranged on an image side of the positive lens G1P.

19. The optical system according to claim 1, wherein the variable-magnification optical system includes two or more negative lenses and one or more positive lenses.

20. The optical system according to claim 1, wherein the variable-magnification optical system is configured to be removably inserted between two lenses included in the main optical system.

21. The optical system according to claim 1, wherein a lens unit that is included in the main optical system and that is moved at time of focusing is configured to be moved in response to insertion and removal of the variable-magnification optical system.

22. The optical system according to claim 1, wherein the main optical system includes an image-stabilizing lens unit that is arranged on an image side of the aperture stop and that is configured to be moved in a direction perpendicular to an optical axis.

23. The optical system according to claim 1, wherein the variable-magnification optical system includes a positive single lens that is arranged the closest to the object side.

24. The optical system according to claim 1, wherein the variable-magnification optical system includes at least one cemented lens.

25. The optical system according to claim 24, wherein the variable-magnification optical system includes a cemented lens obtained by cementing a positive lens and a negative lens arranged on an image side of the positive lens.

26. The optical system according to claim 24, wherein the variable-magnification optical system includes a cemented lens obtained by cementing a negative lens, a positive lens that is arranged on an image side of the negative lens, and a negative lens arranged on the image side of the positive lens.

27. A lens apparatus, comprising:
an optical system; and
a lens barrel configured to hold the optical system, the optical system including:
a main optical system including an aperture stop; and
a variable-magnification optical system configured to be removably inserted between the aperture stop and an image plane,
wherein a distance from a lens surface that is the closest to an object side in the main optical system to the image plane is constant before and after insertion and removal of the variable-magnification optical system,
wherein the main optical system includes a plurality of positive lenses and a plurality of negative lenses, and
wherein the following inequalities are satisfied:

0.20<D1N/LD<0.50, and 0.40<Le/Lp<0.97, where D1N is a distance from the lens surface that is the closest to the object side in the main optical system to a lens surface of a negative lens G1N that is the closest to the object side, among the plurality of negative lenses, and LD is a distance from the lens surface that is the closest to the object side in the main optical system to the image plane, Le is a distance from a lens surface that is the closest to the object side in the variable-magnification optical system to the image plane, and Lp is a distance from the aperture stop to the image plane.

28. An image pickup apparatus, comprising:
an optical system; and
an image pickup element configured to receive light of an image formed by the optical system, the optical system including:
a main optical system including an aperture stop; and
a variable-magnification optical system configured to be removably inserted between the aperture stop and an image plane,
wherein a distance from a lens surface that is the closest to an object side in the main optical system to the image plane is constant before and after insertion and removal of the variable-magnification optical system,
wherein the main optical system includes a plurality of positive lenses and a plurality of negative lenses, and
wherein the following inequalities are satisfied:

0.20<D1N/LD<0.50, and 0.40<Le/Lp<0.97 where D1N is a distance from the lens surface that is the closest to the object side in the main optical system to a lens surface of a negative lens G1N that is the closest to the object side among the plurality of negative lenses, LD is a distance from the lens surface that is the closest to the object side in the main optical system to the image plane, Le is a distance from a lens surface that is the closest to the object side in the variable-magnification optical system to the image plane, and Lp is a distance from the aperture stop to the image plane.

29. An optical system, comprising:
a main optical system including an aperture stop; and
a variable-magnification optical system configured to be removably inserted between the aperture stop and an image plane,
wherein a distance from a lens surface that is the closest to an object side in the main optical system to the image plane is constant before and after insertion and removal of the variable-magnification optical system,
wherein the main optical system includes a plurality of positive lenses and a plurality of negative lenses, and
wherein the following inequality is satisfied:

0.20<D1N/LD<0.50, and 0.20<fb/f<0.90, where D1N is a distance from the lens surface that is the closest to the object side in the main optical system to a lens surface of a negative lens G1N that is the closest to the object side among the plurality of negative lenses, LD is a distance from the lens surface that is the closest to the object side in the main optical system to the image plane, fb is a focal length of a partial optical system that is arranged on an image side of an insertion position of the variable-magnification optical system in the main optical system, and f is a focal length of the main optical system.

30. An optical system, comprising:
a main optical system including an aperture stop; and
a variable-magnification optical system configured to be removably inserted between the aperture stop and an image plane, wherein a distance from a lens surface that is the closest to an object side in the main optical system to the image plane is constant before and after insertion and removal of the variable-magnification optical system, wherein the main optical system includes a plurality of positive lenses and a plurality of negative lenses, and wherein the following inequality is satisfied:

$0.20 < D1N/LD < 0.50$, and $-3.5 < fb/fe < -0.30$, where D1N is a distance from the lens surface that is the closest to the object side in the main optical system to a lens surface of a negative lens G1N that is the closest to the object side among the plurality of negative lenses, LD is a distance from the lens surface that is the closest to the object side in the main optical system to the image plane, fb is a focal length of a partial optical system that is arranged on the image side of an insertion position of the variable-magnification optical system in the main optical system, and fe is a focal length of the variable-magnification optical system.

* * * * *